US012331591B2

(12) United States Patent
Barker

(10) Patent No.: US 12,331,591 B2
(45) Date of Patent: Jun. 17, 2025

(54) LADDER

(71) Applicant: MURPHY LADDER LLC, West Haven, UT (US)

(72) Inventor: Jeremy Barker, Morgan, UT (US)

(73) Assignee: MURPHY LADDER LLC

( * ) Notice: Subject to any disclaimer, the term of this patent is extended or adjusted under 35 U.S.C. 154(b) by 1043 days.

(21) Appl. No.: 17/312,429

(22) PCT Filed: Dec. 13, 2019

(86) PCT No.: PCT/US2019/066162
§ 371 (c)(1),
(2) Date: Jun. 10, 2021

(87) PCT Pub. No.: WO2020/123905
PCT Pub. Date: Jun. 18, 2020

(65) Prior Publication Data

US 2022/0025703 A1 Jan. 27, 2022

Related U.S. Application Data

(63) Continuation-in-part of application No. 16/219,834, filed on Dec. 13, 2018, now abandoned.

(60) Provisional application No. 62/865,185, filed on Jun. 22, 2019.

(51) Int. Cl.

| | |
|---|---|
| ***E06C 1/383*** | (2006.01) |
| ***E06C 1/14*** | (2006.01) |
| ***E06C 7/50*** | (2006.01) |

(52) U.S. Cl.
CPC ................ *E06C 1/383* (2013.01); *E06C 1/14* (2013.01); *E06C 7/50* (2013.01)

(58) Field of Classification Search
CPC ........ E06C 1/383; E06C 9/085; E06C 1/3835; E06C 1/14; E06C 7/50; E06C 7/423
See application file for complete search history.

(56) References Cited

U.S. PATENT DOCUMENTS

| | | | |
|---|---|---|---|
| 295,127 | A | 3/1884 | Miller |
| 2,088,878 | A | 8/1937 | Stogner |
| 2,670,120 | A | 2/1954 | Sanguineti |
| 3,722,622 | A | 3/1973 | Lauring et al. |

(Continued)

FOREIGN PATENT DOCUMENTS

| | | | |
|---|---|---|---|
| CN | 101446176 | A | 6/2009 |
| CN | 108825116 | | 11/2018 |

(Continued)

OTHER PUBLICATIONS

Office Action issued in counterpart Canadian Application No. 3,123,005 on Jul. 21, 2023.

(Continued)

*Primary Examiner* — Janet M Wilkens
*Assistant Examiner* — Susan M. Heschel
(74) *Attorney, Agent, or Firm* — The Belles Group, P.C.

(57) ABSTRACT

A ladder that is foldable and collapsible. The ladder includes a first side rail and a second side rail that are spaced apart from one another by a plurality of rungs extending between the first and second side rails. The rungs may be pivotably coupled to the first and second side rails. The ladder is foldable between a plurality of configurations and the ladder is collapsible rail-to-rail.

20 Claims, 30 Drawing Sheets

(56) References Cited

U.S. PATENT DOCUMENTS

| | | | | | |
|---|---|---|---|---|---|
| 3,756,347 | A * | 9/1973 | Messera | E06C 1/383 | 182/95 |
| 4,245,717 | A * | 1/1981 | Soucy | E06C 1/383 | 182/160 |
| 4,407,045 | A | 10/1983 | Boothe | | |
| 4,463,829 | A * | 8/1984 | Grin | E06C 1/383 | 182/160 |
| 4,560,030 | A | 12/1985 | Mucelli | | |
| 4,815,564 | A | 3/1989 | Yoo | | |
| 5,158,151 | A | 10/1992 | Chang | | |
| 5,170,862 | A * | 12/1992 | Chang | E06C 1/3835 | 182/159 |
| 5,353,892 | A | 10/1994 | Lu | | |
| 6,145,621 | A | 11/2000 | Nye | | |
| 6,536,558 | B2 | 3/2003 | Price | | |
| 6,769,515 | B2 * | 8/2004 | Hillebrecht | E06C 1/3835 | 182/159 |
| D553,757 | S | 10/2007 | Moss | | |
| 7,424,933 | B2 | 9/2008 | Weiss | | |
| 8,191,685 | B1 | 6/2012 | Geiselman | | |
| 9,027,711 | B2 | 5/2015 | Lonergan et al. | | |
| 9,068,394 | B1 | 6/2015 | Geiselman | | |
| 2002/0112920 | A1 | 8/2002 | Price | | |
| 2006/0032708 | A1 * | 2/2006 | Welsh | E06C 1/383 | 182/159 |
| 2006/0213721 | A1 | 9/2006 | Uttaro | | |
| 2007/0295556 | A1 | 12/2007 | Grinberg | | |
| 2012/0012423 | A1 * | 1/2012 | Murphy | E06C 9/085 | 182/96 |
| 2013/0037350 | A1 * | 2/2013 | Geiselman, III | E06C 7/16 | 182/159 |
| 2013/0048429 | A1 | 2/2013 | Lonergan et al. | | |
| 2018/0274296 | A1 | 9/2018 | Foley | | |
| 2019/0136627 | A1 | 5/2019 | Ikonen | | |
| 2020/0308910 | A1 * | 10/2020 | Guillot | E06C 9/085 | |
| 2022/0298861 | A1 | 9/2022 | Major et al. | | |

FOREIGN PATENT DOCUMENTS

| | | | |
|---|---|---|---|
| CN | 108868574 | | 11/2018 |
| CN | 109844255 | A | 6/2019 |
| DE | 20217045 | U1 | 4/2003 |
| EP | 2378052 | A2 | 10/2011 |
| EP | 2878760 | A1 | 6/2015 |
| JP | 6571298 | U | 1/1982 |
| JP | S571298 | U | 1/1982 |
| JP | S63192597 | A | 8/1988 |
| JP | 2006052603 | | 2/2006 |
| NL | 1039300 | C2 | 7/2013 |
| WO | 2007148331 | A2 | 12/2007 |
| WO | 2018005314 | A1 | 1/2018 |

OTHER PUBLICATIONS

Office Action issued in counterpart Chinese Application No. 201980083607.1 on Aug. 28, 2023.

European Search Report 19894846.5 , Issued Dec. 22, 2021.

EP Search Report EP 24150659, Issued Jul. 15, 2024.

* cited by examiner

LADDER

CROSS-REFERENCE TO RELATED PATENT APPLICATIONS

The present application is a U.S. national phase application under 35 U.S.C. § 371 of PCT/US2019/066162, filed Dec. 13, 2019, which claims priority to: (1) U.S. Provisional Patent Application Ser. No. 62/865,185, filed Jun. 22, 2019; and (2) U.S. Nonprovisional patent application Ser. No. 16/219,834, filed Dec. 13, 2018, the entireties of which are incorporated herein by reference.

BACKGROUND OF THE INVENTION

Conventional straight ladders and step ladders have left and right side rails and a plurality of rungs rigidly attached between the side rails. Such conventional ladders occupy a substantial amount of space due to the large open spaces between the rungs and the rails. It can be very difficult for persons without access to a large truck to transport such conventional ladders from one place to another, including transporting such a ladder home from a brick-and-mortar store at which it may be purchased. Furthermore, conventional ladders make it difficult if not impossible to access older homes and structures due to narrow staircases or other obstructions preventing access. Thus, there is a need for a ladder that can be folded and collapsed to reduce its size for storage and transport without affecting the stability and usability of the ladder.

SUMMARY OF THE INVENTION

In one aspect, the invention can be a ladder comprising: a first ladder section comprising: a first side rail extending along a first axis; a second side rail extending along a second axis; a plurality of first rungs having a first end pivotably coupled to the first side rail and a second end pivotably coupled to the second side rail; a first handle on the first side rail; and a second handle on the second side rail; and the first ladder section alterable, by folding the second side rail relative to the first side rail to cause pivoting about the first and second ends of the plurality of first rungs, between: (1) a load bearing ladder state in which the first and second handle are offset from one another in an axial direction; and (2) a rail-to-rail collapsed state in which the first and second side rails are adjacent one another and the first and second handles are at least partially aligned with one another in the axial direction.

In another aspect, the invention can be a ladder comprising: a first ladder section comprising: a first side rail extending along a first axis; a second side rail extending along a second axis; a plurality of first rungs having a first end pivotably coupled to the first side rail and a second end pivotably coupled to the second side rail; a locking assembly alterable between: (1) a locked state in which the first ladder section is locked in a load bearing ladder state; and (2) an unlocked state in which the second side rail can be folded relative to the first side rail to alter the first ladder section between the load bearing ladder state and a rail-to-rail collapsed state; a user-operated actuator located on the second side rail and operably coupled to the locking assembly to alter the locking assembly from the locked state to the unlocked state upon a force being applied to the user-operated actuator in an upward axial direction moving from a bottom end of the second side rail toward a top end of the second side rail; and wherein, upon the locking assembly assuming the unlocked state, continued application of the force to the user-operated actuator in the upward axial direction causes pivoting about the first and second ends of the plurality of first rungs to cause the second side rail to lift and fold toward the first side rail, thereby altering the first ladder section from the load bearing ladder state to the rail-to-rail collapsed state.

In yet another aspect, the invention can be a ladder comprising: a first ladder section comprising: a first side rail extending along a first axis; a second side rail extending along a second axis; a plurality of first rungs having a first end pivotably coupled to the first side rail and a second end pivotably coupled to the second side rail; a locking assembly alterable between: (1) a locked state in which the first ladder section is locked in a load bearing ladder state; and (2) an unlocked state in which the second side rail can be folded relative to the first side rail to alter the first ladder section between the load bearing ladder state and a rail-to-rail collapsed state; a user-operated actuator alterable between a first state and a second state, the user-operated actuator operably coupled to the locking member to alter the locking assembly from the locked state to the unlocked state when altered from the first state to the second state; a first resilient element that biases the user-operated actuator into the first state; and a second resilient element that biases the locking assembly into the locked state.

In a further aspect, the invention can be a ladder comprising: a first ladder section comprising: a first side rail extending along a first axis; a second side rail extending along a second axis; and a plurality of first rungs having a first end pivotably coupled to the first side rail and a second end pivotably coupled to the second side rail; a first locking assembly alterable between: (1) a locked state in which the first ladder section is locked in a load bearing ladder state; and (2) an unlocked state in which the second side rail can be folded relative to the first side rail to alter the first ladder section between the load bearing ladder state and a rail-to-rail collapsed state; a first user-operated actuator located on the second side rail and operably coupled to the first locking assembly to alter the locking assembly from the locked state to the unlocked state; a second ladder section comprising: a third side rail extending along a third axis; a fourth side rail extending along a fourth axis; and a plurality of second cross-members extending between and coupled to the third side rail and the fourth side rail; a second locking assembly alterable between: (1) a locked state in which the second ladder section is locked in a second ladder state; and (2) an unlocked state in which the fourth side rail can be folded relative to the third side rail to alter the second ladder section between the ladder state and a rail-to-rail collapsed state; a second user-operated actuator located on the second side rail and operably coupled to the second locking assembly to alter the second locking assembly from the locked state to the unlocked state; a pair of hinges pivotably coupling the first and second ladder sections to one another, the pair of hinges adjustable between and lockable in a plurality of selectable angular configurations when each of the first and second ladder sections are in a load bearing state, the selectable angular configurations comprising: at least one of: (i) a straight ladder configuration in which the third axis of the third side rail is substantially coaxial with the first axis of the first side rail and the fourth axis of the fourth side rail is substantially coaxial with the second axis of the second side rail; and (ii) a step ladder configuration in which a first acute angle is formed between the first axis of the first side rail and the third axis of the third side rail and a second acute angle is formed between the second axis of the second side rail and the fourth axis of the fourth side rail; and a folded configuration in which the first and third side rails extend adjacent one another and the second and fourth side rails extend adjacent one another so that the first and second user-operated actuators are at least partially aligned with one another in an axial direction.

In an even further aspect, the invention can be a ladder comprising: a first ladder section comprising: a first side rail and a second side rail; a plurality of non-locking first rungs having a first end pivotably connected to the first side rail and a second end pivotably connected to the second side rail; at least one locking rung having a first end pivotably connected to the first side rail and a second end pivotably connected to the second side rail, the at least one locking rung comprising a track; a locking assembly comprising: a locking bar slidably coupled to the locking rung within the track; a locking member pivotably coupled to at least one of the locking rung and the second side rail; and a user-operated actuator operably coupled to the locking member to alter the locking assembly between: (1) a locked state whereby the locking bar is engaged by the locking member so that the locking bar is prevented from sliding within the track of the locking rung; and (2) an unlocked state whereby the locking bar is released from the locking member so that the locking bar can slide freely within the track of the locking rung; wherein when the locking assembly is in the locked state the first ladder section is maintained in a load bearing ladder state in which the first and second side rails are spaced apart from one another by a first distance; and wherein when the locking assembly is in the unlocked state the first ladder section can be altered from the load bearing ladder state to a rail-to-rail collapsed state in which the first and second side rails are spaced apart from one another by a second distance that is less than the first distance.

In a yet further aspect, the invention can be a ladder comprising: a first ladder section comprising: a first side rail extending along a first axis; a second side rail extending along a second axis; a plurality of first rungs having a first end pivotably coupled to the first side rail and a second end pivotably coupled to the second side rail; a locking assembly alterable between: (1) a locked state in which the first ladder section is locked in a load bearing ladder state; and (2) an unlocked state in which the second side rail can be folded relative to the first side rail to alter the first ladder section between the load bearing ladder state and a rail-to-rail collapsed state; a user-operated actuator operably coupled to the locking assembly to alter the locking assembly from the locked state to the unlocked state; and the locking assembly comprising indicia indicating whether the locking assembly is in the locked state or the unlocked state.

In another aspect, the invention can be a collapsible ladder comprising: two or more left side elongate stringers hingedly affixed at a midpoint of the collapsible ladder; two or more right side elongate stringers hingedly affixed at a midpoint of the collapsible ladder; a plurality of rungs having left terminal ends and right terminal ends, the rungs hingedly affixed at each terminal end to a stringer; wherein the ladder is operable to collapse on a longitudinal axis when the ladder is folded at a hinged midpoint; wherein the ladder is operable to collapse on a lateral axis when the left side stringers are moved longitudinally with respect to the right side stringers.

In an even further aspect, the invention can be a ladder comprising: a first ladder section comprising: a first side rail extending along a first axis; a second side rail extending along a second axis; and a plurality of first rungs having a first end pivotably coupled to the first side rail and a second end pivotably coupled to the second side rail; a first locking assembly alterable between: (1) a locked state in which the first ladder section is locked in a load bearing ladder state; and (2) an unlocked state in which the second side rail can be folded relative to the first side rail to alter the first ladder section between the load bearing ladder state and a rail-to-rail collapsed state; a first user-operated actuator operably coupled to the first locking assembly to alter the locking assembly from the locked state to the unlocked state; a second ladder section comprising: a third side rail extending along a third axis; a fourth side rail extending along a fourth axis; and a plurality of second rungs extending between and coupled to the third side rail and the fourth side rail; the second ladder section alterable, by folding the fourth side rail toward the third side rail to cause pivoting about the first and second ends of the plurality of second rungs, between: (1) a load bearing ladder state; and (2) a rail-to-rail collapsed state in which the third and fourth side rails are adjacent one another; and a pair of hinges pivotably coupling the first and second ladder sections to one another, the pair of hinges adjustable between and lockable in a plurality of selectable angular configurations when each of the first and second ladder sections are in a load bearing state, the selectable angular configurations comprising: a straight ladder configuration in which the third axis of the third side rail is substantially coaxial with the first axis of the first side rail and the fourth axis of the fourth side rail is substantially coaxial with the second axis of the second side rail; a step ladder configuration in which a first acute angle is formed between the first axis of the first side rail and the third axis of the third side rail and a second acute angle is formed between the second axis of the second side rail and the fourth axis of the fourth side rail; and a folded configuration in which the first and third side rails extend adjacent one another and the second and fourth side rails extend adjacent one another.

In a still further aspect, the invention can be a ladder comprising: a first ladder section comprising: a first side rail extending along a first axis; a second side rail extending along a second axis; a plurality of first rungs having first and second ends pivotably coupled to the first and second side rails by pivot connection assemblies that are nested between front and rear walls of the first and second side rails; and each of the pivot connection assemblies comprising: an end cap component comprising: a rung receiving tube having a sidewall having an inner surface defining a receiving cavity in which either the first or second end of one of the first rungs is positioned, the receiving cavity extending along a rung axis; and first and second spacer tubes extending from opposite sides of an outer surface of the rung receiving tube, each of the first and second spacer tubes extending along a pivot axis of either the first or second end of one of the first rungs; and a pivot pin extending along the pivot axis and having a first end coupled to the first side rail and a second end coupled to the second side rail, the pivot pin extending through the first and second spacer tube and the end of the first rung that is positioned in the receiving cavity.

Further areas of applicability of the present invention will become apparent from the detailed description provided hereinafter. It should be understood that the detailed description and specific examples, while indicating the preferred embodiment of the invention, are intended

DETAILED DESCRIPTION OF THE INVENTION

Figure 1A:
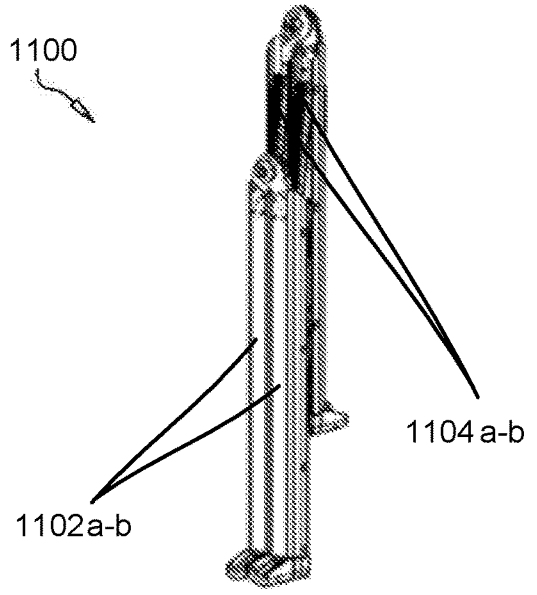
FIG. 1A illustrates a side perspective view of fully collapsible ladder with hinged rungs in accordance with the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as “lower,” “upper,” “horizontal,” “vertical,” “above,” “below,” “up,” “down,” “top” and “bottom” as well as derivatives thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation unless explicitly indicated as such. Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 1B:
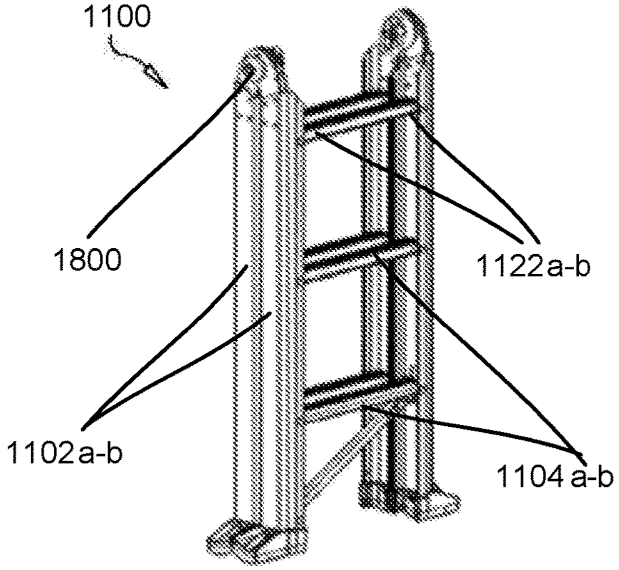
FIG. 1B illustrates a forward side perspective view of fully collapsible ladder with hinged rungs in accordance with the present invention.

FIG. 1A-1B illustrate a forward side perspective view of fully collapsible ladder with hinged rungs 1100 in accordance with the present invention.

A plurality of rung members 11104*a*-*b* are hingedly affixed to two or more elongate stringers 1102*a*-*b*. Each rung 1104 comprises two terminal ends 1122*a*-*b*, with each terminal end 1122 hingedly affixed to a stringer 1102.

Each of the rung members 1104 comprises an elongate shaft, tube, beam, rod, or extruded polymeric or aluminum step or rung portion having a first end terminal end 1122*a* and second terminal end 1122*b*.

The stringers 1102 may also be provided with apertures 1142 which serve as hand holds for porting the ladder 1100.

The ladder 1100 folds at hinges 1800 affixed between adjacent stringers 1102. The hinge 1800 is known to those of skill in the art, and further described below in relation to FIG. 8.

FIG. 1A shown the ladder 1100 in a fully collapsed configuration on both axes while FIG. 1B shows the ladder 1100 is semi-collapsed configuration on a single axis. When the ladder 1100 is in either a fully collapsed or semi-collapsed configuration, the ladder 1100 is operable to collapse on its widthwise axis by moving the stringers 1102 along one side of the rungs 1104 along the longitudinal axis against the position of the stringers 1102 on an opposing side of the ladder 1100. The ladder 1100 is operable to collapse on both lengthwise and widthwise axes in a semi-collapsed or fully extended position.

Figure 1C:
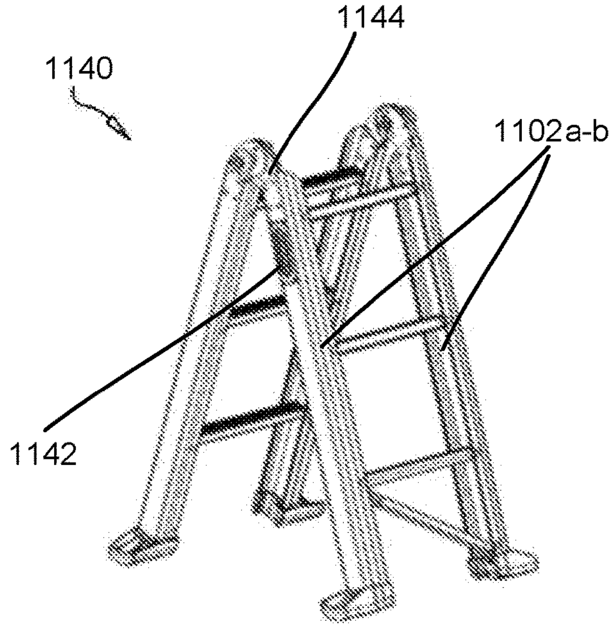
FIG. 1C illustrates a forward side perspective view of fully collapsible ladder with hinged rungs in accordance with the present invention.

FIG. 1C illustrates a forward side perspective view of fully collapsible ladder 1140 with hinged rungs in accordance with the present invention.

Figure 1D:
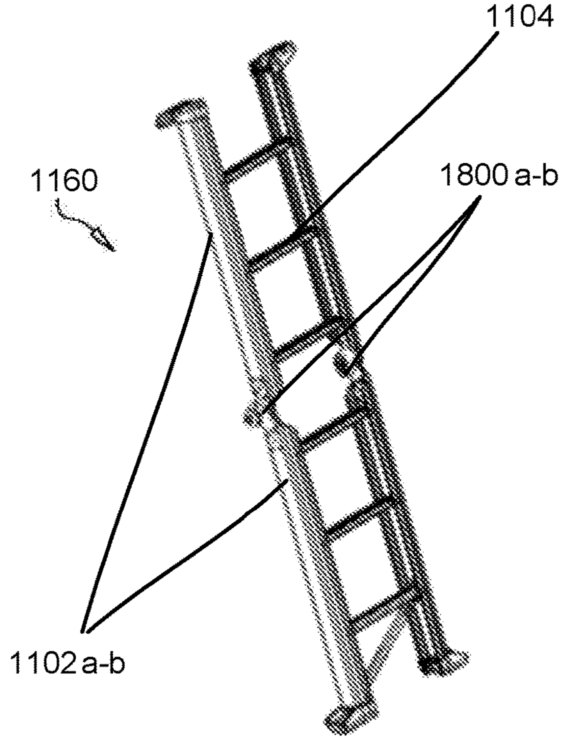
FIG. 1D illustrates a forward side perspective view of fully collapsible ladder with hinged rungs in accordance with the present invention.

Shown in an open semi-collapsed position, the ladder 1140 may also be folded open at the hinges 1800 to configure as a fully-extended position depicted in FIG. 1D.

The ladder 1140 is provided with a latching mechanism 1144. The latching mechanism 1144 may include a simple hinge as known to those of skill in the art or a more complex hinge 1800 as further described below.

FIG. 1D illustrates a forward side perspective view of fully collapsible ladder with hinged rungs in accordance with the present invention.

In its fully extended position shown, the ladder 1160 is operable to collapse on its widthwise, or lateral, axis by moving the stringer 1102 in vertically opposed directions.

Figure 2:
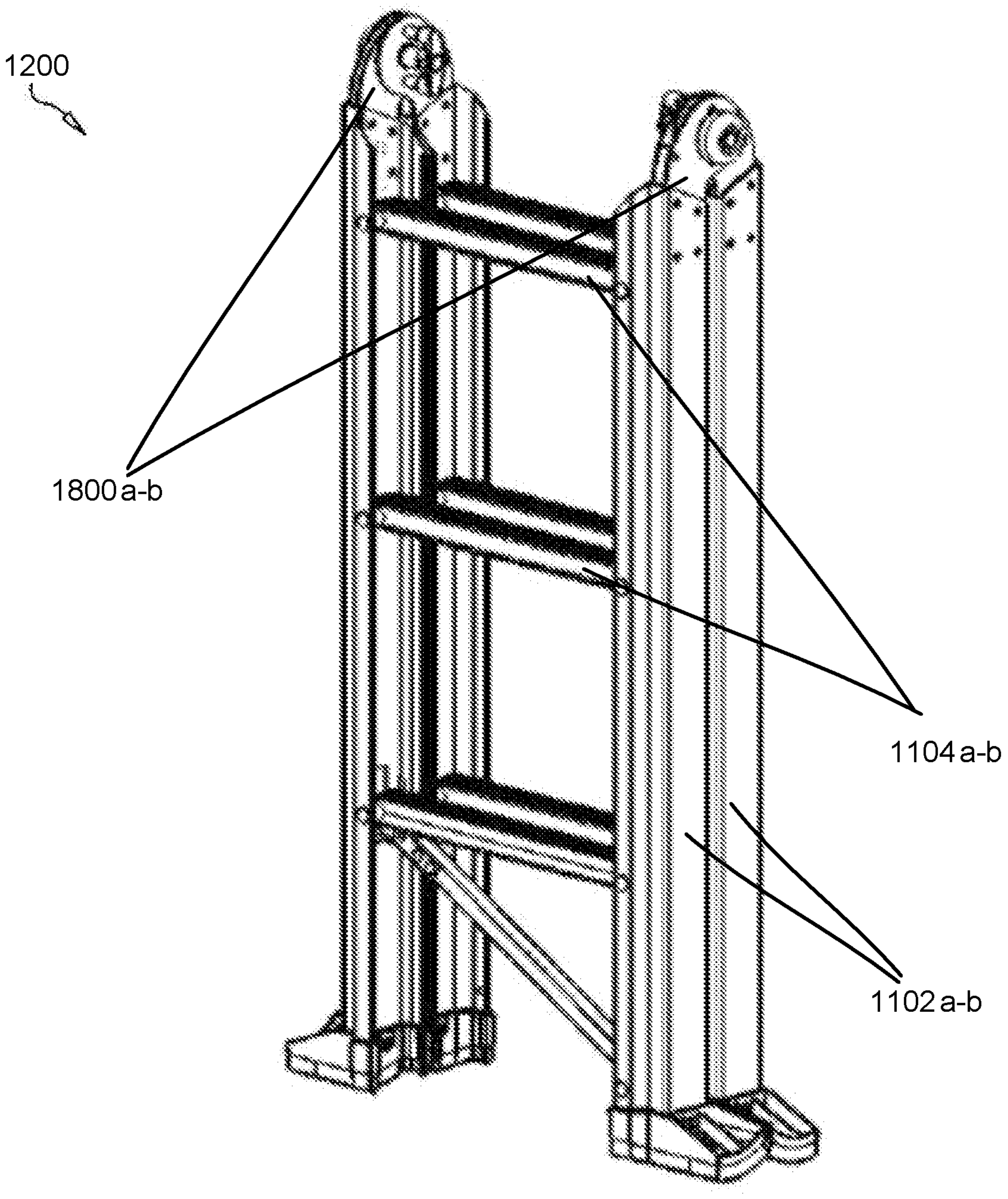
FIG. 2 illustrates a forward side perspective view of fully collapsible ladder with hinged rungs in accordance with the present invention.

FIG. 2 illustrates a forward side perspective view of fully collapsible ladder 1200 with hinged rungs in accordance with the present invention.

The rungs 1104 may be formed with ridges, molded or otherwise formed thereon, to increase track and stability of a user positioned on the rungs 1104. These ridges 1702 act to provide a relatively non-slip surface on the steps. Other non-slip surfaces may be provided instead, as would be evident to a person skilled in the art.

Figure 3:
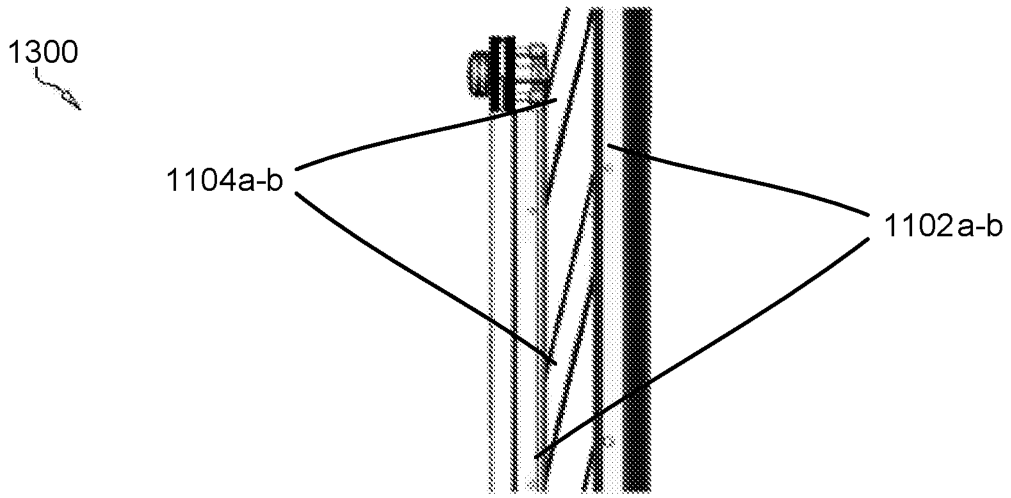
FIG. 3 illustrates a forward side perspective view of fully collapsible ladder with hinged rungs in accordance with the present invention.

FIG. 3 illustrates a forward side perspective view of fully collapsible ladder 1300 with hinged rungs in accordance with the present invention.

The rungs 1104 operate to pivot about attachment point with the stringers 1102.

Figure 4:
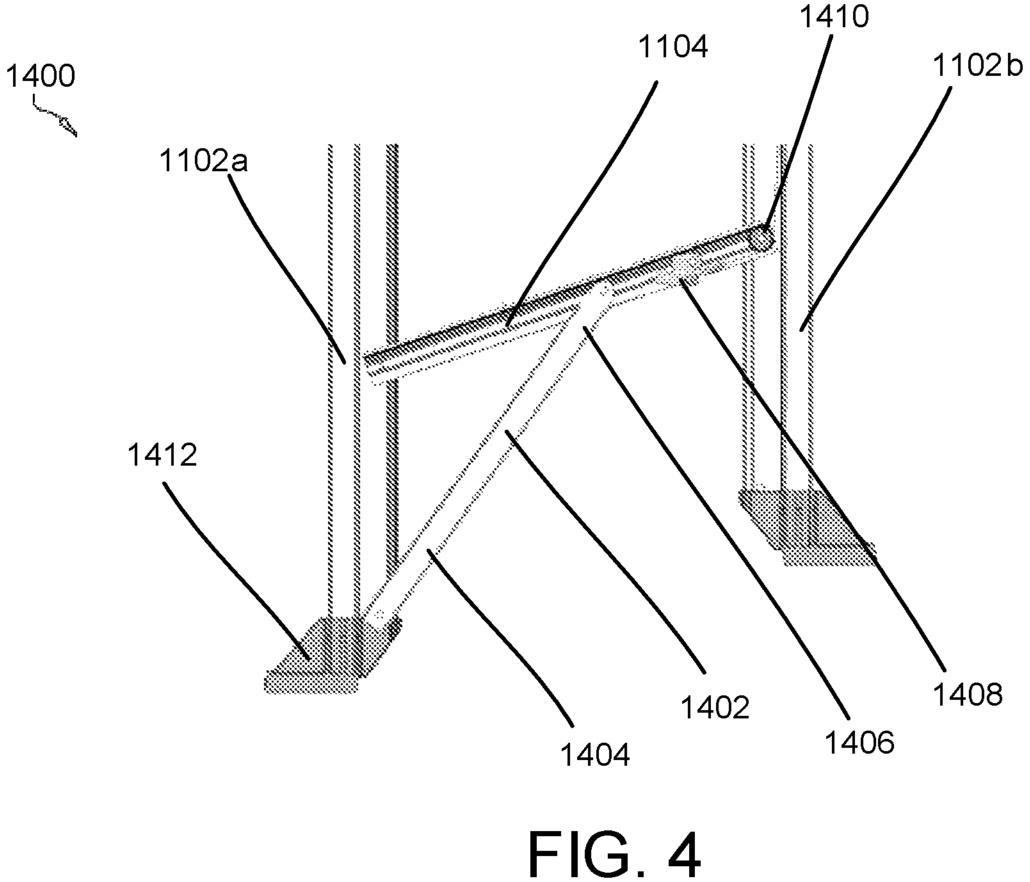
FIG. 4 illustrates a rearward, exploded perspective view of fully collapsible ladder with hinged rungs in accordance with the present invention.

FIG. 4 illustrates a rearward, exploded perspective view of fully collapsible ladder 1400 with hinged rungs in accordance with the present invention.

In various embodiments, the ladder 1400 comprises a diagonal brace 1402 which positions beneath each rung 1104. The diagonal brace 1402 is hingedly affixed at first terminal end 404 to a stringer 1102 as shown. At a second terminal end 1406, the diagonal brace 1402 affixes to one of a rung 1104 and/or a pully or track within which the second terminal end 1406 travels. The second terminal end 1406 may affix to mounting bracket 1408 which travels within a traveling mechanism such as the pully 1410 shown.

The diagonal brace 1402 is adapted to restrict motion of the rung 1104 to which the diagonal brace 1402 is connected from moving more than 90 degrees. In the shown embodiment, the rung 1104 is restricted from axially rotating about its left terminal end in a clockwise direction when the rung 1104 is in perpendicular orientation to the stringer 1102 from a forward perspective.

The ladder 1400 may comprise a plurality of polymeric feet 1412.

Figure 5:
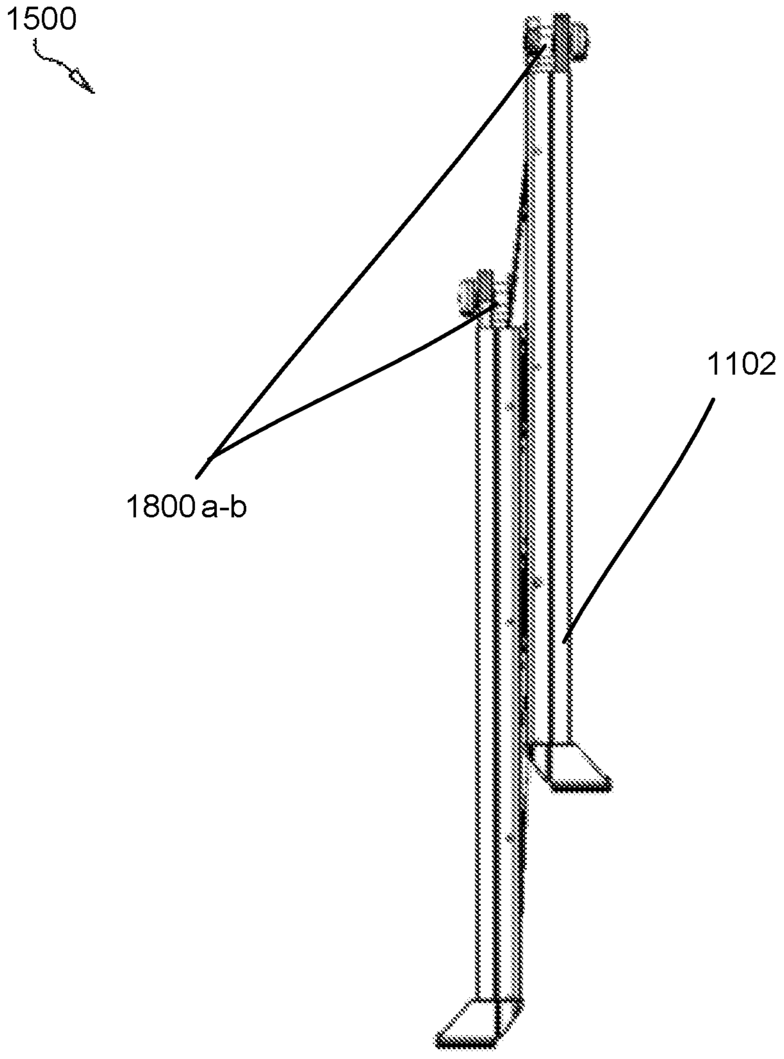
FIG. 5 illustrates a side perspective view of fully collapsible ladder with hinged rungs in accordance with the present invention.

FIG. 5 illustrates a side perspective view of fully collapsible ladder 1500 with hinged rungs in accordance with the present invention. The ladder 1500 is shown in a semi-collapsed configuration.

Figure 6:
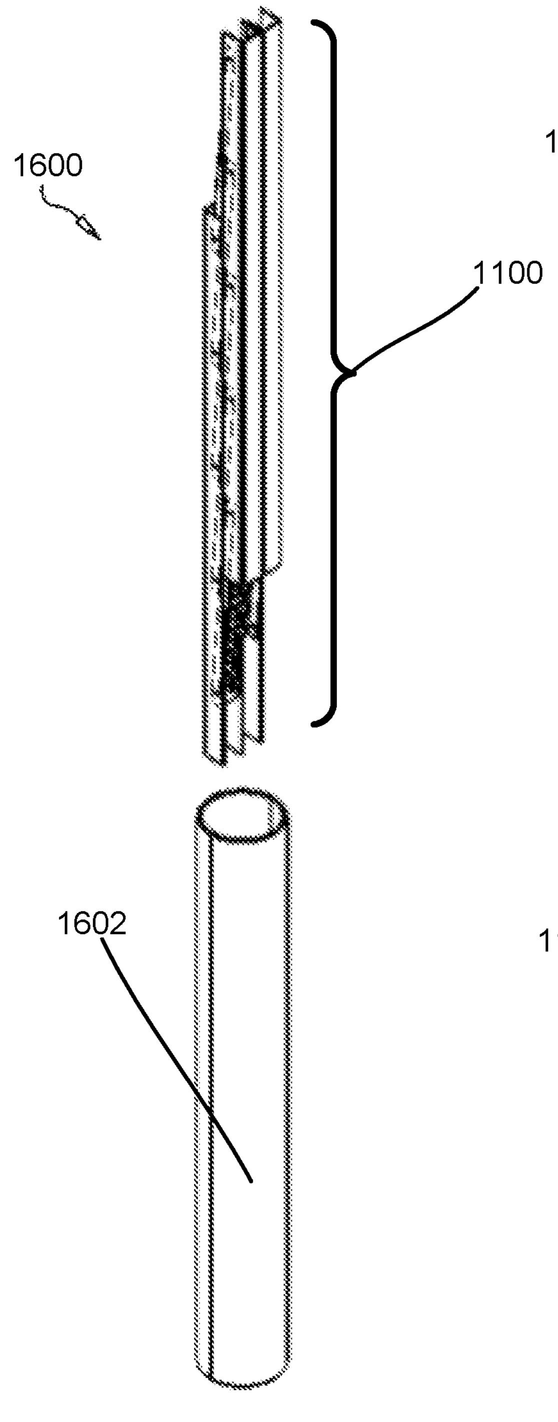
FIG. 6 illustrates a side perspective view of fully collapsible ladder and carrying tube with hinged rungs in accordance with the present invention.

FIG. 6 illustrates a side perspective view of fully collapsible ladder and carrying tube 600 with hinged rungs in accordance with the present invention.

The fully collapsed ladder 1100 may insert into a tube 1602 which allows the ladder 1100 to be ported without unfolding during transport. The tube 1602 may cylindrical and formed from polymeric or metal alloy.

If needed, a user can stack multiple fully collapsed ladders 1100 one upon one another.

Figure 7:
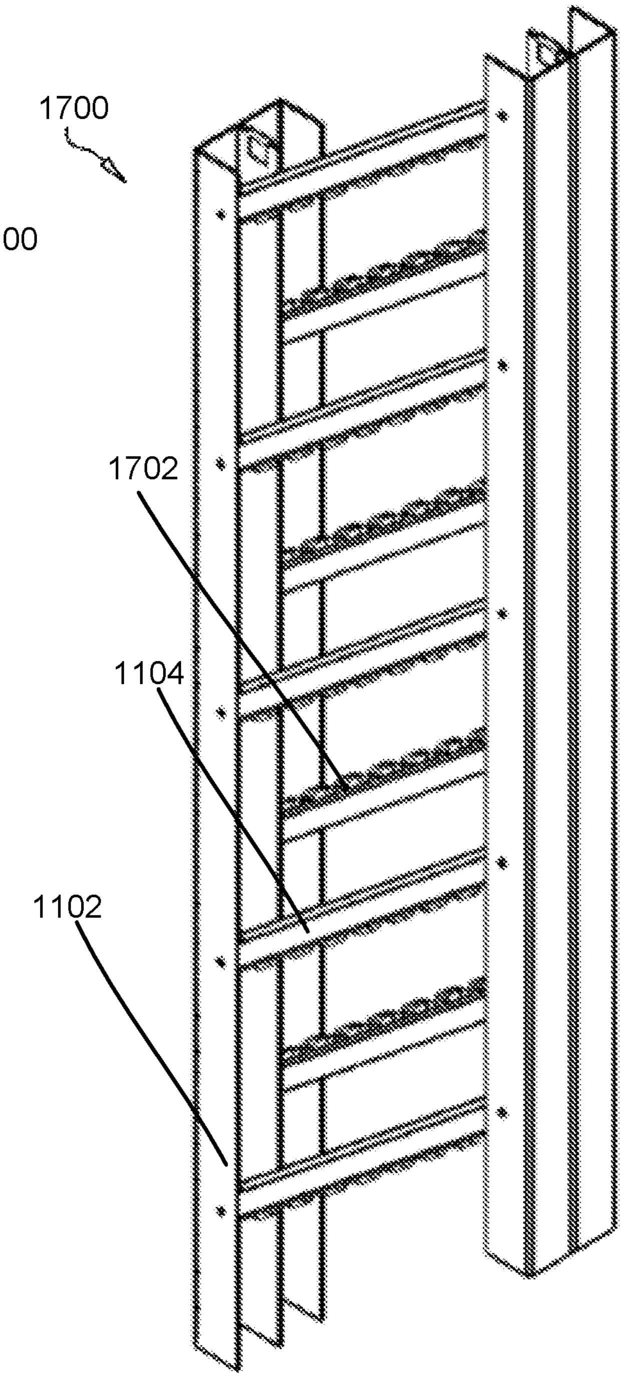
FIG. 7 illustrates a forward perspective view of fully collapsible ladder with hinged rungs in accordance with the present invention.

FIG. 7 illustrates a forward perspective view of fully collapsible ladder 1700 with hinged rungs in accordance with the present invention.

In various embodiments, the rungs 1104 are hingedly affixed to pivot less than 90 degrees off a perpendicular orientation to the stringer 1102, with each rung 1102 pivoting forward on a vertical (or longitudinal) axis at one terminal end and rearward on the vertical axis at the opposing vertical end.

Figure 8:
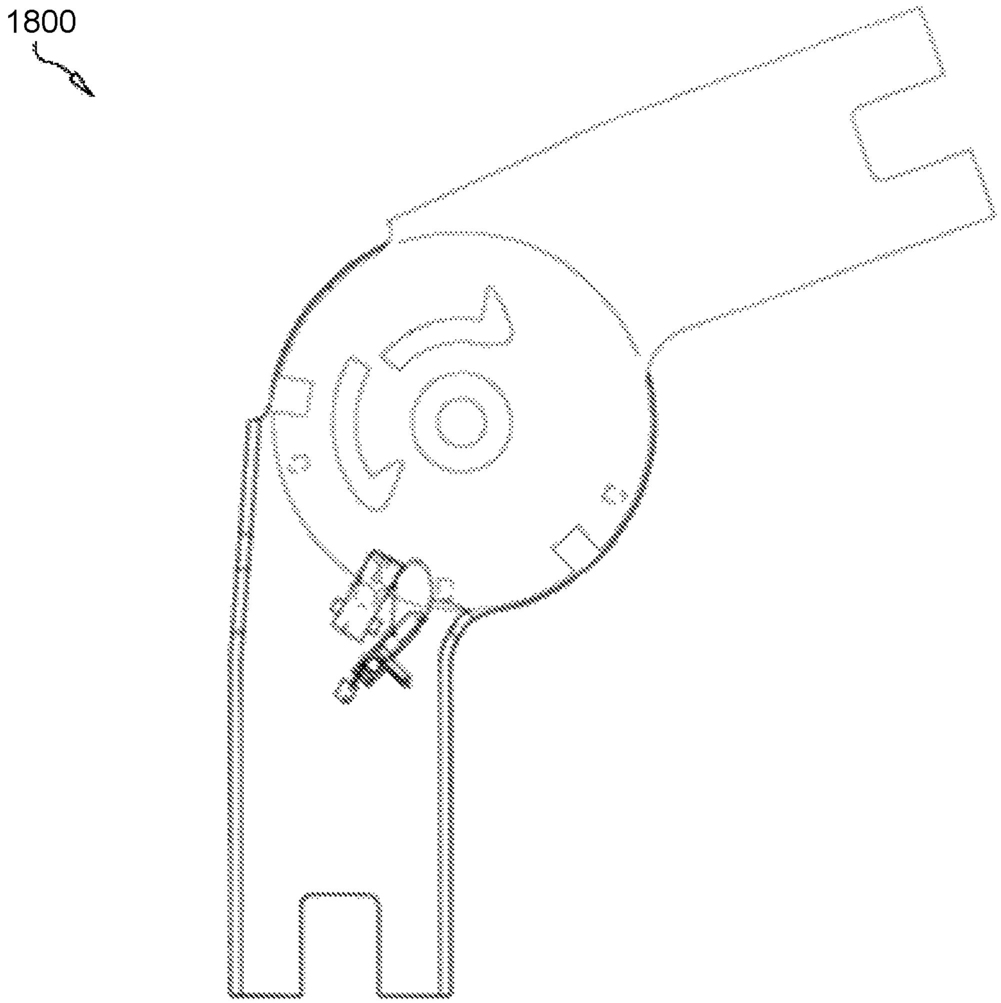
FIG. 8 (Prior Art)
FIG. 8 illustrates a side perspective view of an interlocking hinge for foldable ladders in accordance with the prior art.

FIG. 8 illustrates a side perspective view of an interlocking hinge 1800 for foldable ladders in accordance with the prior art.

A hinge 1800 for foldable ladders known in the prior art comprises a first joint member integrally formed with main discs, a second joint member integrally formed with a sub disc, a locking device having a button, a connecting pin, a coil spring, a rectangular locking block and a press locking control device for controlling to latch or unlatch the locking device. The first and second joint members are combined together through a common axis of a center shaft enabling them to rotate. The sub disc of the second joint member is inserted between a pair of parallel spaced main discs of the first joint member. The main discs of the first joint member have slot openings for inserting the locking device. The first protruded arcuate stopper is disposed at the inner surface of the main disc. The second protruded arcuate stopper is formed at the rear surface of the sub disc of the second joint member for matching with the first protruded arcuate stopper of main disc. A plurality of detents is formed around periphery of the sub disc. At one side of slot opening of the main disc, a press locking control device is installed for elastically actuating the device.

The hinge 1800 may be integrated into a ladder 1100 as shown, between two stringer 1102. In various configurations, the hinge 1800 positions at a midway point on the ladder 1100 between two stringers of identical length.

Figure 9:
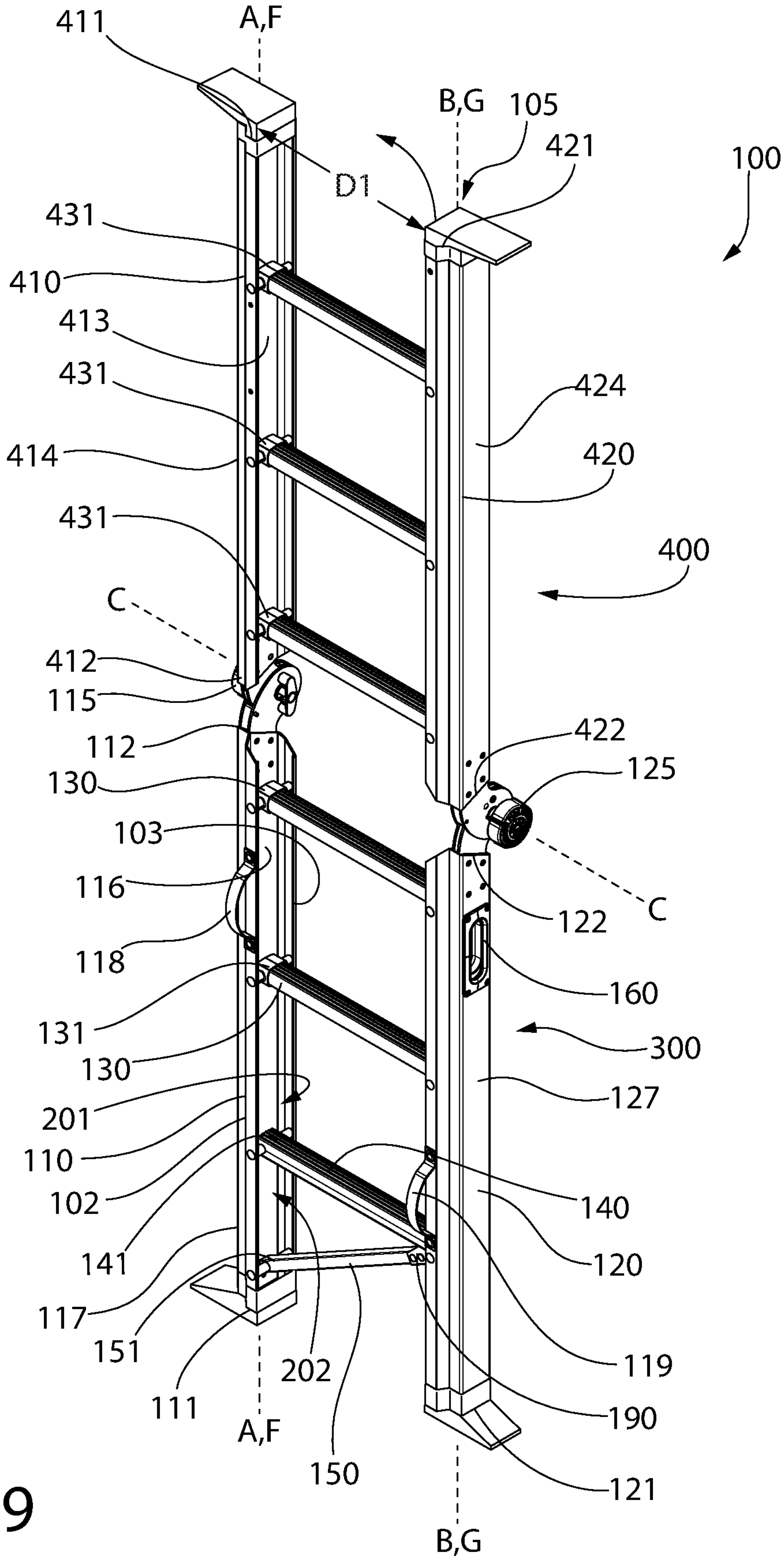
FIG. 9 is a perspective view of a ladder in accordance with an embodiment of the present invention, wherein the ladder is in an extended and non-collapsed configuration.

Referring to FIG. 9, a ladder 100 is illustrated in accordance with an embodiment of the present invention. The ladder 100 generally comprises a first ladder section 300 and a second ladder section 400. A pair of locking hinges, comprising a first locking hinge 115 and a second locking hinge 125, pivotably couple the first and second ladder sections 300, 400 to one another. As will be discussed in greater detail below, the pair of hinges 115, 125 are adjustable between and lockable in a plurality of selectable angular configurations when each of the first and second ladder sections 300, 400 are in a load bearing state. The selectable angular configurations comprising a straight ladder configuration (shown in FIG. 9), a step ladder configuration (shown in FIG. 11), and a folded configuration (shown in FIG. 12). In certain embodiments, the ladder 100 may be designed such that the selectable angular configurations only include the step ladder configuration (shown in FIG. 11) and the folded configuration (shown in FIG. 12). In other embodiments, the ladder 100 may only comprise the first ladder section 300 in which the second ladder section 400 and pair of hinges 115, 125 are omitted.

The first ladder section 300 generally comprises a first side rail 110 extending from a bottom end 111 to a top end 112 along a first axis A-A and a second side rail 120 extending from a bottom end 121 to a second end 122 along a second axis B-B. The first side rail 110 comprises an inner surface 116 and an outer surface 117 and the second side rail 120 comprises an inner surface 126 (FIG. 15) and an outer surface 127.

The first ladder section 300 also comprises a plurality of first rungs (which comprise first non-locking rungs 130 and first locking rung 140) extending between the first and second side rails 110, 120. Each of the plurality of first non-locking rungs 130 comprises a first end 131 that is pivotably coupled to the first side rail 110 along or adjacent to the inner surface 116 of the first side rail 110 and a second end 132 (shown in FIG. 15) that is pivotably coupled to the second side rail 120 along or adjacent to the inner surface 126 of the second side rail 120. The first ends 131 of the non-locking rungs 130 comprise an aperture through which a pin/rod that is connected to the front and rear sidewalls 102, 103 of the first side rail 110 extends to permit the pivotability of the first non-locking rungs 130 relative to the first side rail 110. Similarly, the second ends 132 of the first non-locking rungs 130 comprise an aperture through which a pin/rod that is connected to the front and rear sidewalls 105, 106 (not visible) of the second side rail 120 extends to permit the pivotability of the first non-locking rungs 130 relative to the second side rail 120. The first non-locking rungs 130 are all freely pivotable relative to the first and second side rails 110, 120 to facilitate altering the first ladder section 300 between a load bearing ladder state (shown in FIGS. 9, 11 and 12) and a rail-to-rail collapsed state (shown in FIGS. 10 and 13), as will be describe din greater detail below.

Figure 12:
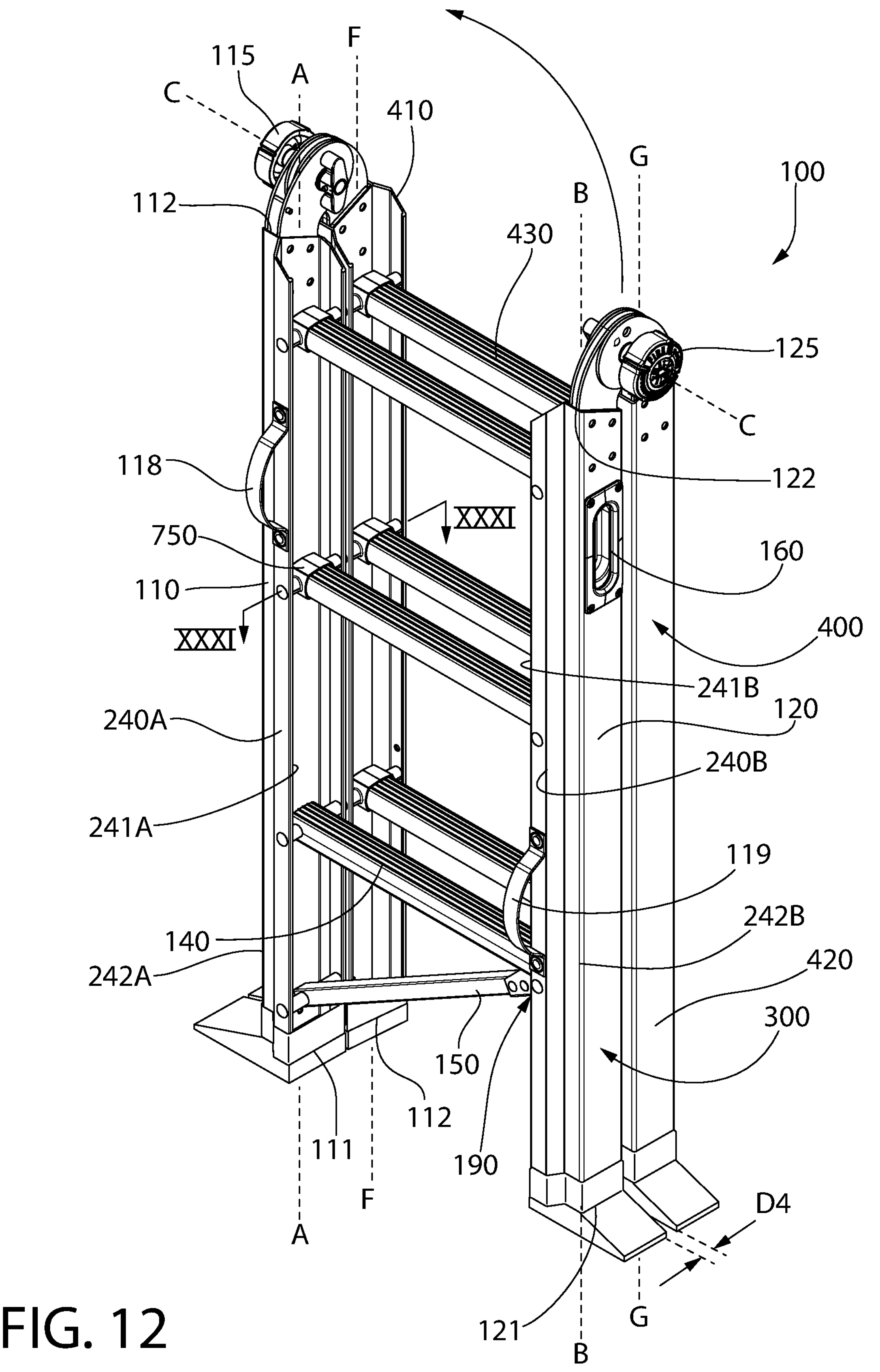
FIG. 12 is a perspective view of the ladder of FIG. 9 in a folded and non-collapsed configuration.
Figure 31:
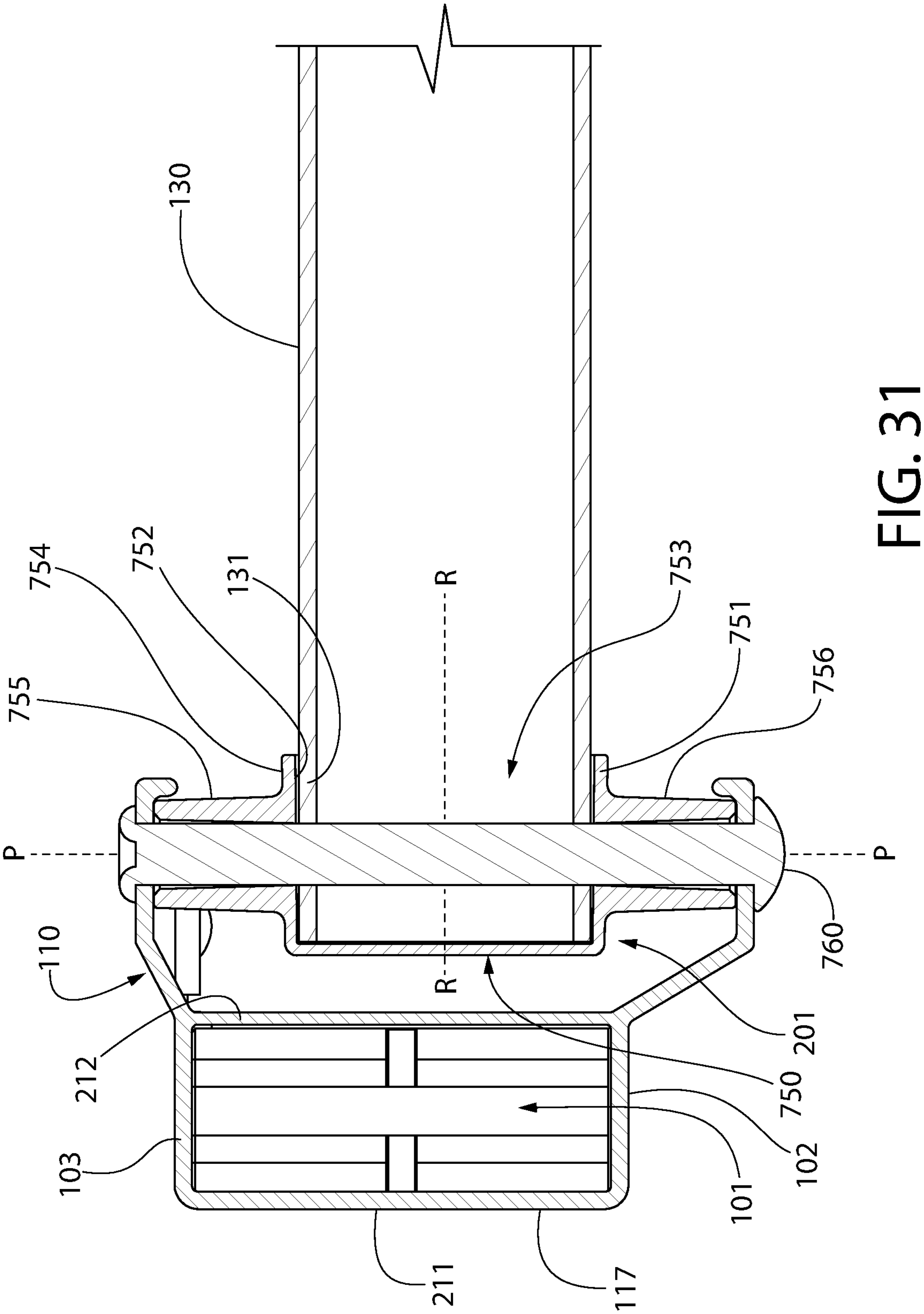
FIG. 31 is a cross-section taken along view XXXI-XXXI of FIG. 12 showing the details of how the ends of the rungs are pivotably coupled to the first and second side rails.

More specifically, and now referring to FIGS. 12 and 31 concurrently, each of the first and second ends 131, 132 of the first rungs 130 are pivotably coupled to the first and second side rails 110, 120 by a pivot connection assembly generally comprising an end cap component 750. While the pivotable connection will be described below with respect to the first end 131 of one of the first rungs 130 being pivotably coupled to the first side rail 110, it is to be understood that the second ends 132 of the first rungs 130 are pivotably coupled to the second side rail 120 in an identical manner. Moreover, the second rungs 430 of the second ladder section 400 are also pivotable coupled to the third and fourth rails 410, 420 in an identical manner.

As can be seen in FIG. 31, the end cap component 750 is nested between the portions of the front and rear walls 102, 103 of the first and second side rails 110 that extend form the inner wall 212. The end cap component 750 comprises a rung receiving tube 751 having a sidewall having an inner surface 752 defining a receiving cavity 753 in which the first end 131 of the first rung 130 is positioned. The receiving cavity 753 extends along a rung axis R-R. The end cap component 750 further comprises first and second spacer tubes 755, 756 extending from opposite sides of an outer surface 752 of the rung receiving tube 751. Each of the first and second spacer tubes 755, 756 extend along a pivot axis P-P upon which the first end 131 of the first rung 130 pivots when the first ladder section 300 is altered between the load bearing ladder state and the rail-to-rail collapsed state.

A pivot pin 760 is provided that extends along the pivot axis P-P and has a first end coupled to the front wall 102 of the first side rail 110 and a second end coupled to the rear wall 103 of the first side rail 110. As can be seen, the pivot pin 760 extending through the first and second spacer tubes 755, 756, through the first end 131 of the first rung 130 that is positioned in the receiving cavity 753, and through apertures in the front and rear walls 102, 103 of the first side rail 110. The spacer tubes 755, 756 have an outer diameter that is larger than the apertures in the in the front and rear walls 102, 103 of the first side rail 110 through which the pin 760 extends. Thus, the spacer tubes 755, 756 maintain the first rung 130 in a properly spaced relationship from the front and rear walls 102, 103 of the first side rail 110. Finally, the rung receiving tube 751 has a closed end wall that prevents sliding of the first rung 130 within the end cap component 750.

Figure 11:
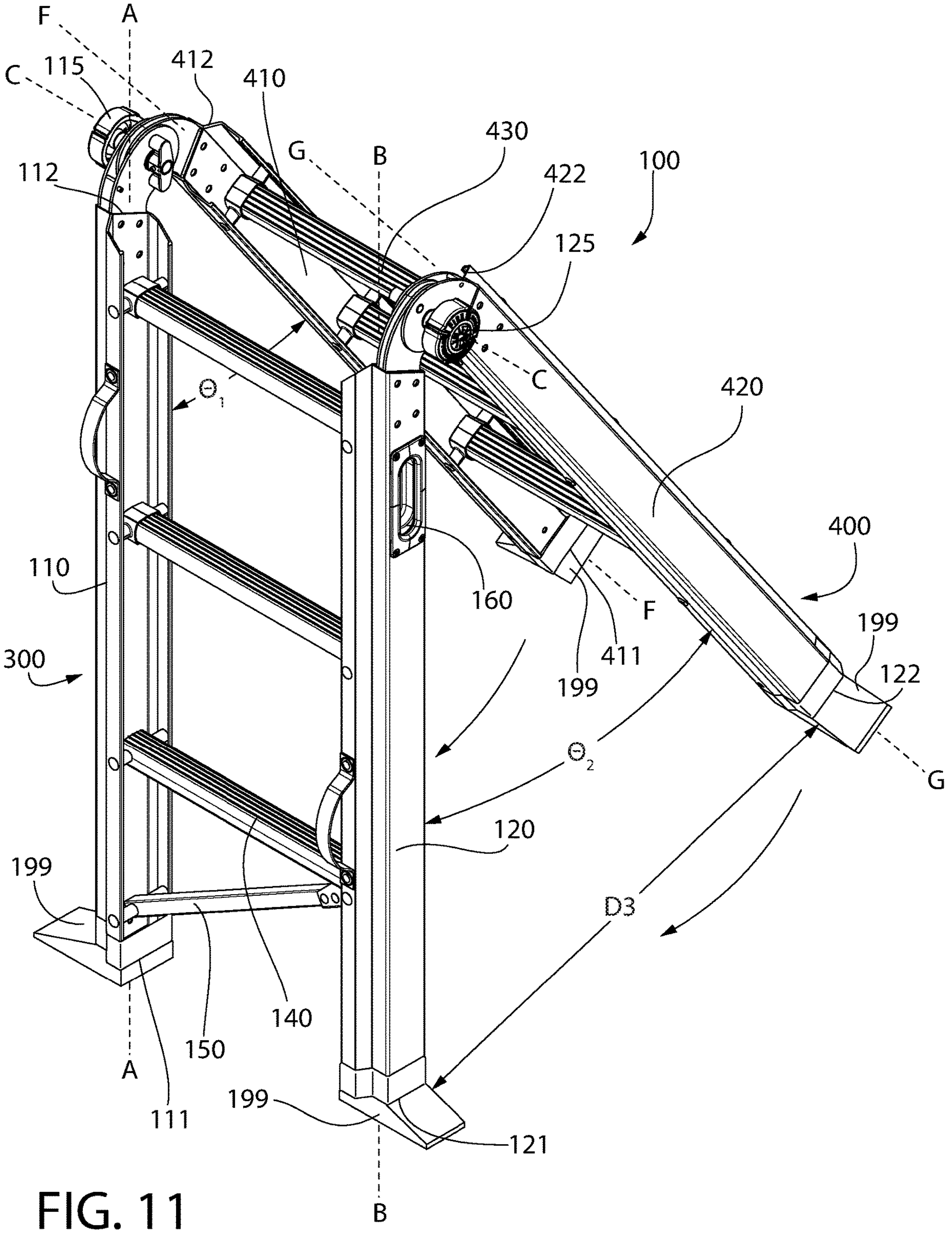
FIG. 11 is a perspective view of the ladder of FIG. 9 in a step ladder configuration.

Referring back to FIG. 9, similar to the first ladder section 300, the second ladder section 400 generally comprises a third side rail 410 extending from a bottom end 411 to a top end 412 along a third axis F-F and a fourth side rail 420 extending from a bottom end 421 to a top end 422 along a fourth axis G-G. As shown in FIG. 9 in which the ladder 100 is in the straight ladder configuration, the third axis F-F of the third side rail 410 is substantially coaxial with the first axis A-A of the first side rail 110 and the fourth axis G-G of the fourth side rail 420 is substantially coaxial with the second axis B-B of the second side rail 120. When in the step ladder configuration, as shown in FIG. 11, a first acute angle θ1 is formed between the first axis A-A of the first side rail 110 and the third axis F-F of the third side rail 410 and a second acute angle θ2 is formed between the second axis B-B of the second side rail 120 and the fourth axis G-G of the fourth side rail 420. When in the folded configuration, as shown in FIG. 12, the first and third side rails 110, 410 extend adjacent one another and the second and fourth side rails 120, 420 extend adjacent one another. Moreover, in certain embodiments, when in the folded state, the first and third axes A-A, F-F are substantially parallel to one another and the second and fourth axes B-B, G-G are substantially parallel to one another shown in FIG. 12).

The third side rail 410 comprises an inner surface 413 and an outer surface 414 and the fourth side rail 420 comprises an inner surface (not visible) and an outer surface 424. The second ladder section 400 also comprises a plurality of cross-members, which in the exemplified embodiment is a plurality of second rungs 430, which are non-locking rungs (as described below, in other embodiments, such as the one shown in FIGS. 27A-B the plurality of second rungs 430 may include a locking rung 435). In other embodiments where it is not desired that the second ladder section be a load bearing ladder section, the cross-members may take the form of struts that are either collapsible and/or pivotably coupled to the third and fourth side rails 410, 420.

The plurality of second rungs 430 are pivotably coupled to the third and fourth side rails 410, 420 in the same manner in which the first non-locking rungs 130 are coupled to the first and second side rails 110, 120. Thus, while not called out in detail in the FIGS., each of the plurality of second rungs 430 comprises a first end that is pivotably coupled to the third side rail 410 along or adjacent to the inner surface 413 of the third side rail 410 and a second end that is pivotably coupled to the fourth side rail 420 along or adjacent to the inner surface of the second side rail 420. Thus, in the exemplified embodiment, the second rungs 430 are all freely pivotable relative to the third and fourth side rails 410, 420 to facilitate altering the second ladder section 400 between a load bearing ladder state (shown in FIGS. 9, 11 and 12) and a rail-to-rail collapsed state (shown in FIGS. 10 and 13), as will be describe din greater detail below.

As mentioned above, the first and second locking hinges 115, 125 are adjustable between and lockable in a plurality of selectable angular configurations. When rotated into one of the selectable angular configurations (e.g., the straight ladder configuration, the step ladder configuration, and the folded configuration), the first and second locking hinges 115, 125 will automatically assume a locked state as the result of resilient elements, such as coil springs, biasing the first and second locking hinges 115, 125 into a mechanical interlock. The first and second locking hinges 115, 125 will remain in the locked state until a user applies force to a hinge actuator that will overcome the bias of the resilient elements and release the mechanical interlock. Once the mechanical interlock is released, the first and second ladder sections 300, 400 can be rotated relative to one another about a rotational axis C-C that is transverse to the first, second, third, and fourth axes A-A, B-B, F-F, and G-G. As such, the ladder 100 can be altered between and locked in the selectable angular configurations.

The first and second locking hinges 115, 125 can be the hinge shown and described above with respect to FIG. 8. Additionally, examples of suitable hinges for the first and second locking hinges 115, 125 are shown described in U.S. Pat. Nos. 7,364,017, 7,264,082, 6,220,389, 7,047,597, 6,886,117, and 4,182,431, the entireties of which are incorporated herein by reference.

Figure 15:
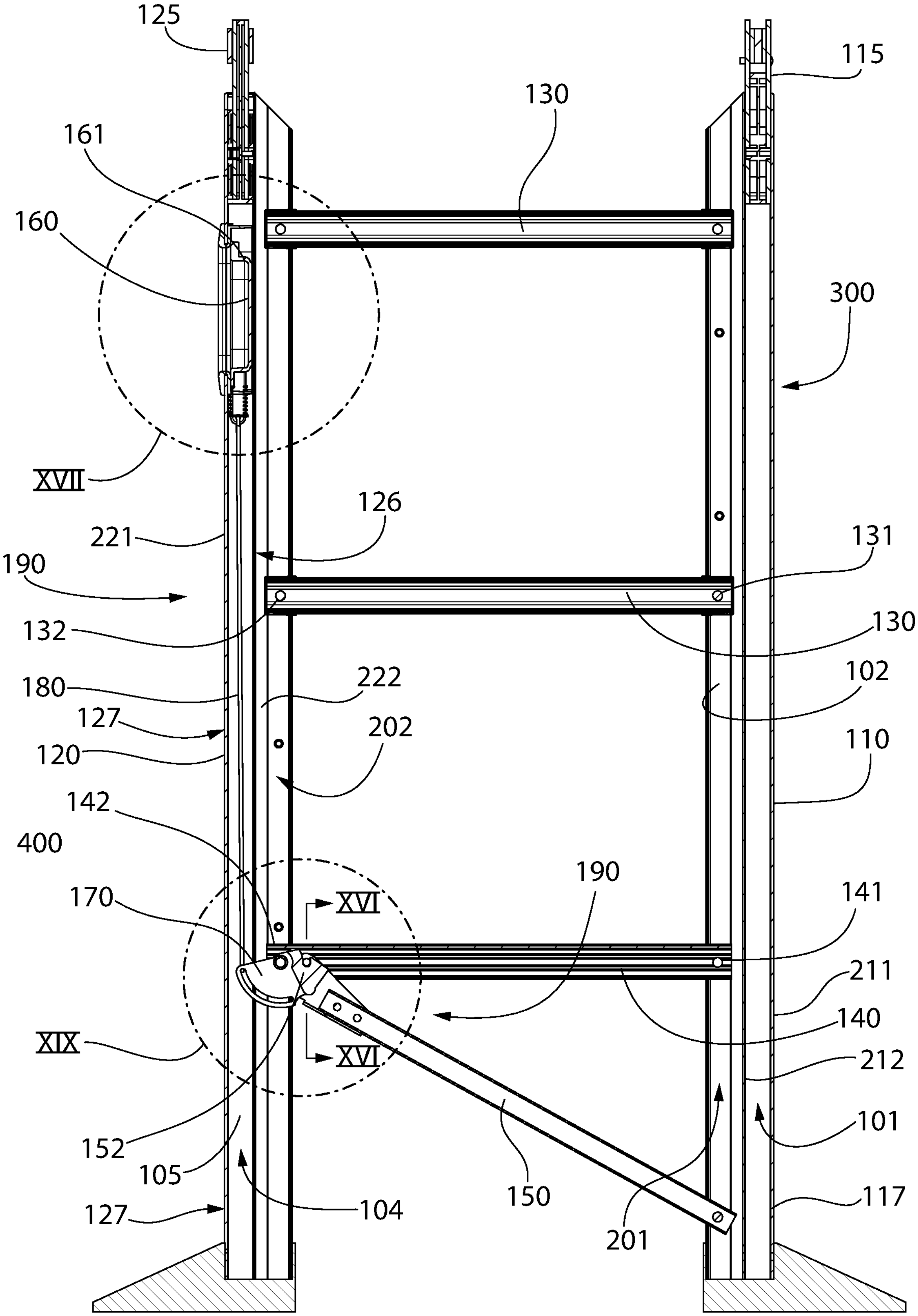
FIG. 15 is a cross-sectional view taken along line VII-VII of FIG. 14.

Referring now to FIGS. 9, 15, and 31 concurrently, the first side rail 110 comprises a first enclosed channel 101 and a first open channel 201. The first side rail 110 comprises a first outer wall 211 comprising the outer surface 117, a first inner wall 212 comprising the inner surface 126, the first front wall 102, and the first rear wall 103. The first enclosed channel 101 comprises a closed transverse cross-sectional profile formed by the first outer wall 211, the first inner wall 212, the first front wall 102, and the first rear wall 103. The first open channel 201 comprises a U-shaped open transverse cross-sectional profile formed by the first inner wall 212, a portion of the first front wall 102 that extends inward beyond the first inner wall 212, and a portion of the first rear wall 103 that extends inward beyond the first inner wall 212.

Similarly, the second side rail 120 comprises a second enclosed channel 104 and a second open channel 202. The second side rail 120 comprises a first outer wall 221 comprising the outer surface 127, a first inner wall 222 comprising the inner surface 126, the second front wall 105, and the second rear wall (not visible). The second enclosed channel 104 comprises a closed transverse cross-sectional profile formed by the second outer wall 221, the second inner wall 222, the second front wall 105, and the second rear wall. The second open channel 202 comprises a U-shaped open transverse cross-sectional profile formed by the second inner wall 222, a portion of the second front wall 105 that extends inward beyond the second inner wall 222, and a portion of the second rear wall that extends inward beyond the second inner wall 222.

As can be understood from the above discussion, the first and second side-rails 110, 120 have the same construction and the same transverse cross-sectional profile and, in some embodiments, are sections of the same extruded rail. Moreover, while not discussed herein in detail to avoid redundancy, the third and fourth side rails 410, 410 also have the same construction and same transverse cross-sectional profile as the first and second side rails 110, 120 and, thus, also comprise an open channel and a closed channel as described above.

Figure 13:
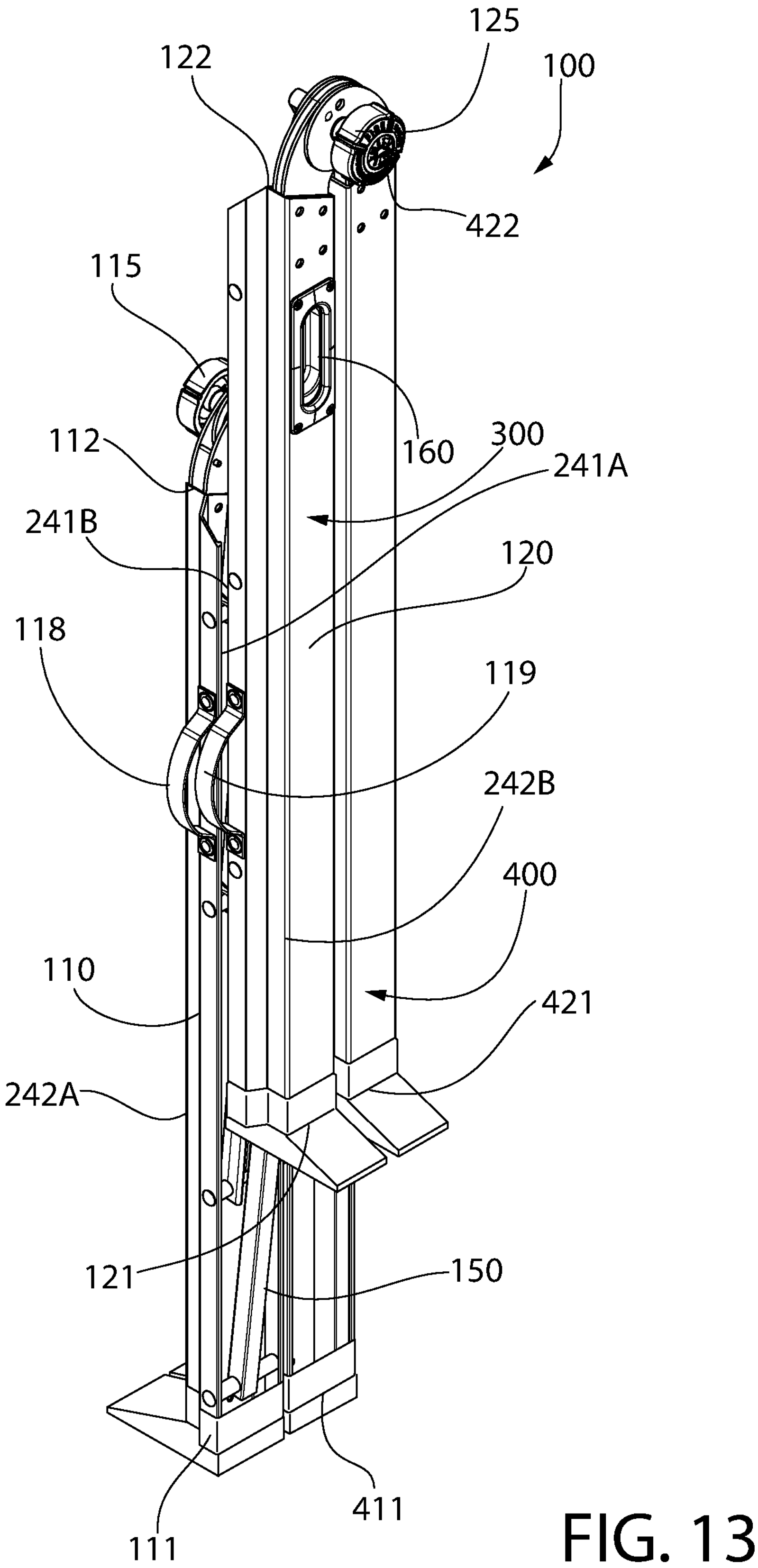
FIG. 13 is a perspective view of the ladder of FIG. 9 in a folded and collapsed configuration.

Referring now to FIGS. 12 and 13 concurrently, when in the folded configuration, both the first and second ladder sections 300, 400 are alterable between a load bearing ladder state (FIG. 12) and a rail-to-rail collapsed state (FIG. 13). The first ladder section 300 is altered from the load bearing ladder state to the rail-to-rail collapsed state by folding the second side rail 120 relative to the first side rail 110 to cause pivoting about the first and second ends 131, 132 of the plurality of first rungs 130, 140. When the first ladder section 300 is in the load bearing ladder state, the first and second side rails 110, 120 are substantially parallel to and spaced from one another a first distance and the plurality of first rungs 130, 140 are substantially perpendicular to the first and second side rails 110, 120 (and, thus, the first and second axes A-A, B-B). When the first ladder section 300 is in in the rail-to-rail collapsed state, the first and second side rails 110, 120 are substantially parallel to and spaced from one another a second distance and the plurality of first rungs 130, 140 are inclined relative to the first and second side rails 110, 120 (and, thus, the first and second axes A-A, B-B). The first distance is greater than the second distance.

Similarly, the second ladder section 400 is also altered from the load bearing ladder state to the rail-to-rail collapsed state by folding the second side rail 420 relative to the first side rail 410 to cause pivoting about the first end 431 and the second ends (not visible) of the plurality of second rungs 430. When the second ladder section 400 is in the load bearing ladder state, the third and fourth side rails 410, 420 are substantially parallel to and spaced from one another a first distance and the plurality of second rungs 430 are substantially perpendicular to the third and fourth side rails 410, 420 (and, thus, the third and fourth axes F-F, G-G). When the second ladder section 400 is in in the rail-to-rail collapsed state, the third and fourth side rails 410, 420 are substantially parallel to and spaced from one another a second distance and the plurality of second rungs 430 are inclined relative to the third and fourth side rails 410, 420 (and, thus, the third and fourth axes F-F, G-G). The first distance is greater than the second distance.

Because the first and second ladder sections 300, 400 are coupled together via the pair of hinges 115, 125 (and specifically the second side rail 120 is coupled to the fourth side rail 420 side rail 410 by the hinge 125, the second and fourth side rails 120, 420 move as unit. Thus, the first and second ladder sections 300, 400 are contemporaneously altered between their load bearing ladder state to their rail-to-rail collapsed in a concerted manner. Additionally, during the transition from the load bearing ladder state to the rail-to-rail collapsed of the first ladder section 300, the first side rail 110, the second side rail 120, and the plurality of first rungs 130, 140 maintain a first parallelogram linkage. Similarly, during the transition from the load bearing ladder state to the rail-to-rail collapsed of the second ladder section 400, the third side rail 410, the fourth side rail 420, and the plurality of second rungs 430 maintain a second parallelogram linkage.

As will be described in greater detail below, the first ladder section 100 further comprises a user-operated actuator 160 and a locking assembly 190. The user-operated actuator 160 is operably coupled to the locking assembly 190 to alter the locking assembly 190 from a locked state to an unlocked state upon an actuation force being applied to the user-operated actuator 160 in an upward axial direction (moving from the bottom end 121 of the second side rail 120 toward the top end 122 of the second side rail 120). When the locking assembly 190 is in the locked state, the first ladder section 300 (and thus the second ladder section 400) is locked in its load bearing ladder state and can not be altered into its rail-to-rail collapsed configuration. When the locking assembly 190 is in the unlocked state, the second side rail 120 can be folded relative to the first side rail 110 to alter the first ladder section 300 between its load bearing ladder state and its rail-to-rail collapsed state (as can the second ladder section 400).

When the first and second ladder sections 300, 400 are in the load bearing ladder states (shown in FIGS. 9, 11, and 12), each of the first and second rungs 130, 140, 430 are configured to support the weight of a user of the ladder 100. Furthermore, each of the first and second rungs 130, 140, 430 may have a textured upper surface to prevent slippage by a user during use.

Figure 14:
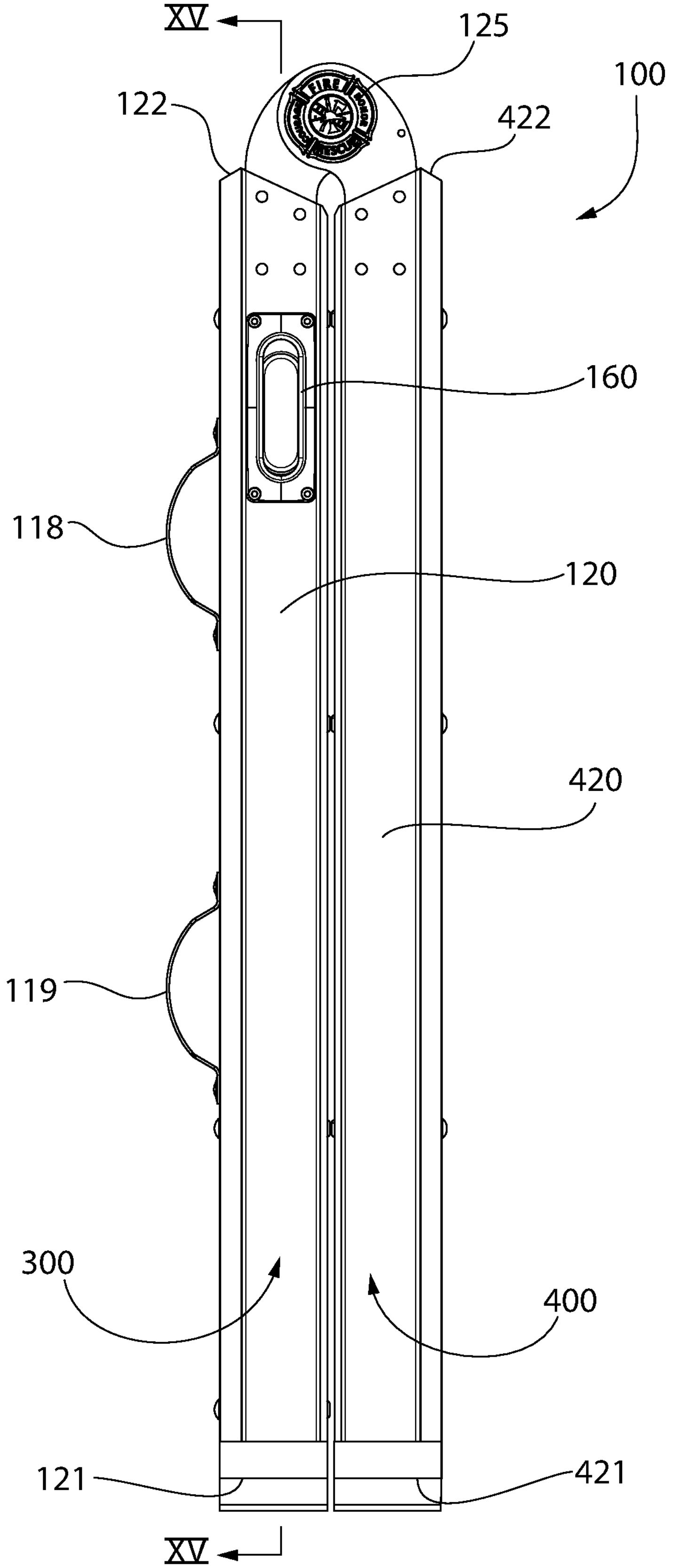
FIG. 14 is a side view of the ladder of FIG. 13.

Referring to FIGS. 12-14 concurrently, the first ladder section 300 also comprises a first handle 118 on the first side rail 110 and a second handle 119 on the second side rail 120. The first and second handles 118, 119 are positions on the first and second side rails 110, 120 respectively so that when the first ladder section 300 is in the load bearing ladder state, the first and second handles 118, 119 are offset from one another in an axial direction (as shown in FIGS. 12 and 14). As can be seen, the first handle 118 is located a first distance from the bottom end 111 of the first side rail 110 and the second handle 119 is located a second distance from a bottom end 121 of the second side rail 120, the first distance being greater than the second distance.

When the first ladder section 300 is altered into the rail-to-rail collapsed state, the first and second handles 118, 119 are at least partially aligned with one another in the axial direction. Most preferably, as shown in FIG. 13, when the first ladder section 300 is altered into the rail-to-rail collapsed state, the first and second handles 118, 119 are in complete alignment with one another in the axial direction. Having the first and second handles 118, 119 positioned so as to be at least partially aligned as set forth above, a user can grasp and transport the ladder 100 (when both the first and second ladder sections 300, 400 are in the rail-to-rail configuration) with a single hand.

Each of the first and second side rails 110, 120 comprise a front surface 240A, 240B having an inner edge 241A, 241B and an outer edge 242A, 242B respectively. The first handle 118 is positioned on the front face of the first side rail adjacent the inner edge 241A of the front surface 240A of the first side rail 110. The second handle 119 is positioned on the front surface 240B of the second side rail 120 adjacent the inner edge 241B of the front surface face 240B of the second side rail 120. As a result of this placement, the user's ability to carry the ladder 100 in the rail-to-rail collapsed state with one hand is further facilitated. Moreover, this positioning of the first and second handles 118, 119 maintains the first and second ladder sections 300, 400 in the rail-to-rail collapsed state when the first and second handles are gripped.

In the exemplified embodiment, each of the first and second handles 118, 119 comprises a strap component. In other embodiments, the handles 118, 119 may be in the form of flexible or rigid structure, protuberances, cutouts, or other gripping structures.

Figure 16:
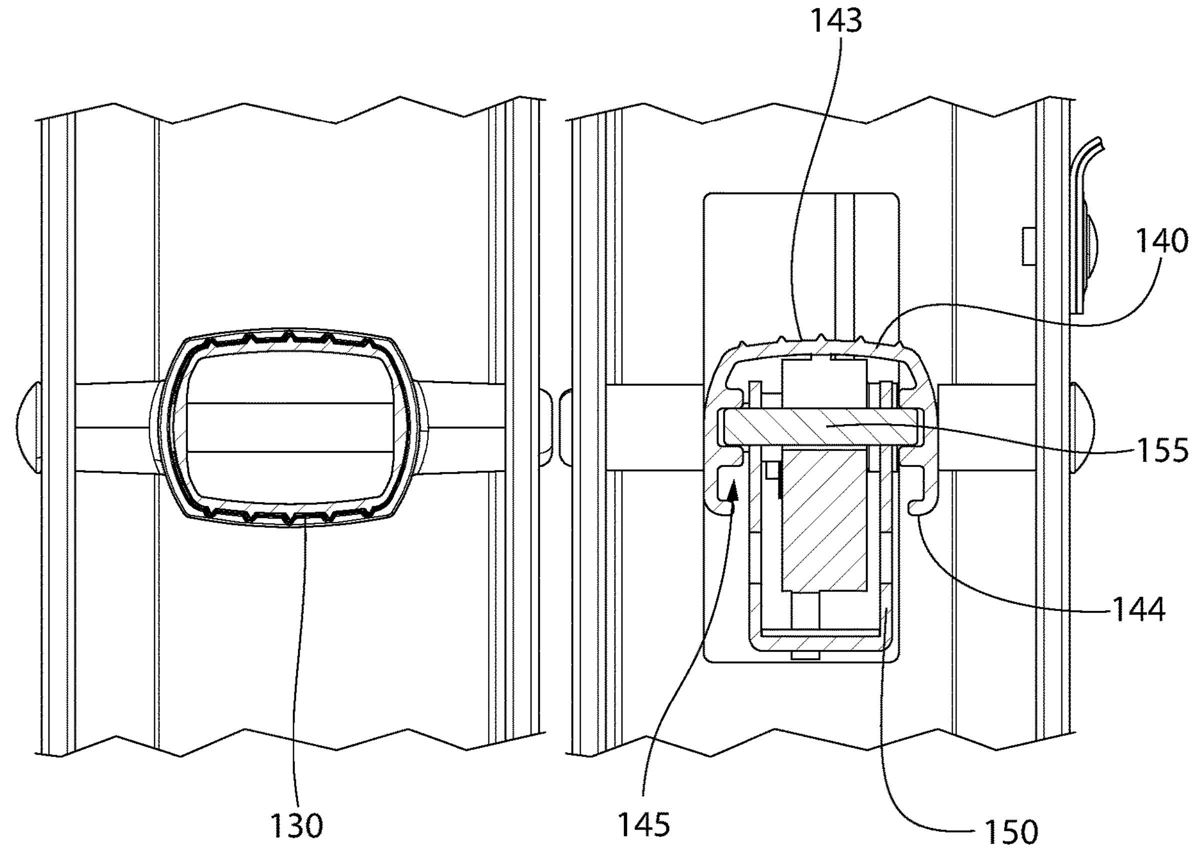
FIG. 16 is a cross-sectional view taken along line VIII-VIII of FIG. 15.

Referring to FIGS. 9 and 15-16 concurrently, the first ladder section 300 further comprises at least one locking rung 140 having a first end 141 pivotably coupled to the first side rail 110 and a second end 142 (FIG. 15) connected to the second side rail 120. In some embodiments, the second end 142 may be pivotably coupled to the second side rail 120, although this may not be required in all embodiments. The coupling of the locking rung 140 to the first and second side rails 110, 120 may be achieved in the same manner as the coupling of the non-locking rungs 130 to the first and second side rails 110, 120 described above (using an aperture/pin structure). In the exemplified embodiment, there is only one of the locking rungs 140, but the invention is not to be so limited in all embodiments and the ladder 100 could include more than one of the locking rungs 140 on the first and/or second ladder sections 300, 400 as desired. In the exemplified embodiment, the locking rung 140 is the lowermost rung of the first ladder section 300, although the invention is not to be so limited in all embodiments and the locking rung 140 could be located at other positions along the ladder 100. The locking rung 140 is also configured to support the weight of a user when the first ladder section 300 is in the load bearing ladder state.

The locking first rung 140 has a different cross-sectional shape than the non-locking first rungs 130. Specifically, the non-locking rung 140 comprises an upper surface 143, a lower surface 144, and a track 145 formed into the lower surface 144 having an opening in the lower surface 144. The track 145 is essentially a channel formed into the non-locking rung 140. The track 145 is configured to slidably receive a portion of a locking bar 150 so that the locking bar 150 can slide within the track 145 relative to the locking rung 140 when the first ladder section 300 is altered between load bearing ladder state and the rail-to-rail collapsed states.

Figure 19:
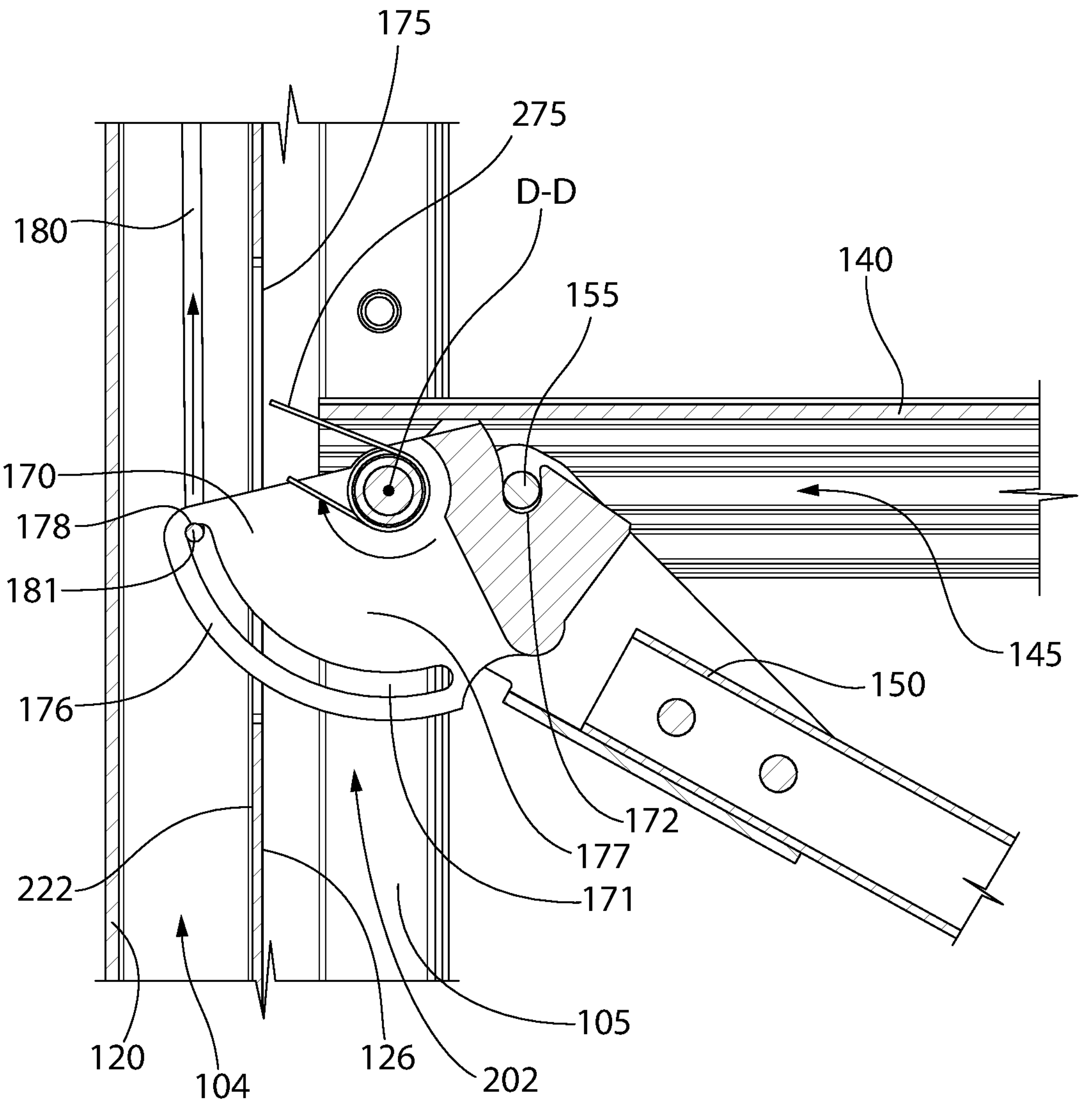
FIG. 19 is a close-up view of area X of FIG. 15 illustrating a locking member in a locked state.

Referring now to FIGS. 9 and 15 concurrently, the first ladder section 300 comprises a locking assembly 190 that generally comprises the locking bar 150, a locking member 170, and a resilient element 275 (FIG. 19). The resilient element 275, which is exemplified as a torsion spring, is operably coupled to the locking member 170 as will be described in greater detail below with respect to the functioning of the locking assembly 190. A user-operated actuator 160 is operably coupled to locking assembly 190 to be capable of altering the locking assembly 190 from a locked state (see FIG. 19) to an unlocked state (see FIG. 20) upon an actuation force being applied to the user-operated actuator 160. In the exemplified embodiment, the actuator 160 is operably coupled to the locking assembly 190 by a linkage 180. The linkage 180 is a rigid rod in the exemplified but embodiment but can take on may forms, such as a flexible cable, a bar, or coupler. In the exemplified embodiment, the linkage 180 is located within the second enclosed channel 104 of the second side rail 120 so that the cable 180 is not exposed to a user but rather is positioned internally and out of sight during normal use and operation of the ladder 110.

Referring now to FIGS. 15 and 17-20, a process of altering the locking assembly 190, using the actuator 160, from a locked state (in which the first ladder section 300 is locked in the load bearing ladder state) and an unlocked state (in which the first ladder section 300 can be altered from the load bearing ladder state to the rail-to-rail collapsed state) will be described.

Figure 17:
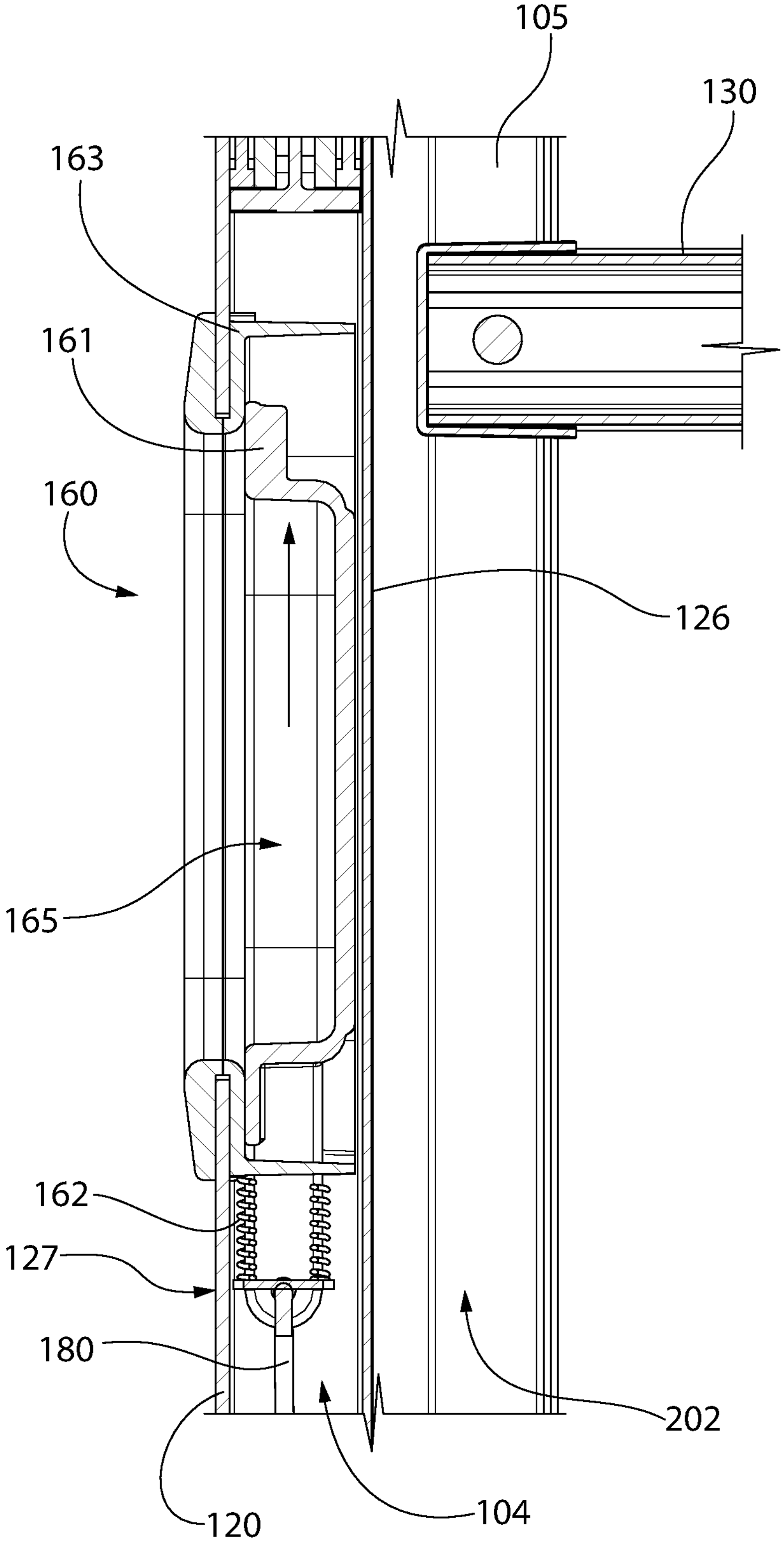
FIG. 17 is a close-up view of area IX of FIG. 15 illustrating an actuator in a first state.

Starting with FIGS. 17 and 19, the first ladder section 300 is in the load bearing ladder state (such as that which is shown in FIG. 12). When in this state, the locking assembly 190 is in a locked state (shown in FIG. 19) and the actuator 160 is in a first state (shown in FIG. 17). The actuator 160 comprises slide trigger 161 and a resilient element 162, which is in the form of a coil spring 162. The slide trigger 161 is nested within a depression 165 in the outer surface 127 of the second side rail 120. As can be seen, the slide trigger 161 is coupled to the linkage 180 and both the slide trigger 161 and the linkage 180 are disposed within the second enclosed channel 104.

The resilient element 162 is arranged such that the actuator 160 is biased into the first state. When the actuator 160 is in the first state, the locking member 170 is also in the locked state, as will be described below. In the exemplified embodiment, the resilient element 162 is a compression coil spring. However, the invention is not to be so limited in all embodiments and the resilient element 162 could be a flexible member formed from rubber or the like, or it could be a different type of spring.

The trigger 161 is located within a housing 163 of the actuator 160 and can be moved upwardly for actuation as shown by the arrow in FIG. 17. The distance of movement of the trigger 161 for actuation may be relatively small, such as 0.1 to 3 inches, or more specifically 0.1 to 2 inches, or more specifically 0.1 to 1 inch.

The locking member 170 is pivotably mounted to the second side rail 120. The locking member 170 (and the locking bar 150) are illustrated in the position that corresponds to the actuator 160 being in the first state. As noted above, the linkage 180 is operably coupled to the locking member 170 at one end and the slide trigger 161 of the actuator 160 at the other end 182. Thus, if the linkage 180 moves upwardly in the direction of the arrow due to actuation of the actuator 160 from the first state to the second state, the locking member 170 will pivot about a pivot axis D-D as shown by the arcuate arrow.

The locking member 170 comprises a first portion 176 located within the second enclosed channel 104 and a second portion 177 protruding from the second inner wall 222. As can be seen, the locking member 170 extends through an opening 175 in the second inner wall 222 of the second rail 120 so that the second portion 177 is located within the second open channel 202 of the second side rail 120. The linkage 180 is coupled to the first portion 175 of the locking member 170. The second portion 177 of the locking member 170 comprises an engagement feature 172, in the form of socket, that engages a locking component 155 of the locking bar 150. As a result of the engagement between the engagement feature 172 and the locking component 155 of the locking bar 150, the locking bar 150 is locked in place and can not slide relative to the locking rung 140. If not for the locking component 155 being engaged by the engagement feature 172, the locking bar 150 would be freely slidable relative to the locking rung 140.

The resilient element 275, which is torsion spring that engages the locking member 170 and an edge of the locking rung 140, biases the locking member 170 into the locked state shown in FIG. 19. The locking member 170 comprises an elongated arcuate slot 171 and a second end 181 of the cable 180 is coupled to the locking member 170 within the slot 171.

The actuator 160 is operably coupled to the linkage 180 so that upward axial movement of the trigger 161 (away from the bottom end 121 of the second side rail 120) also results in upward axial movement of the linkage 180.

Figure 18:
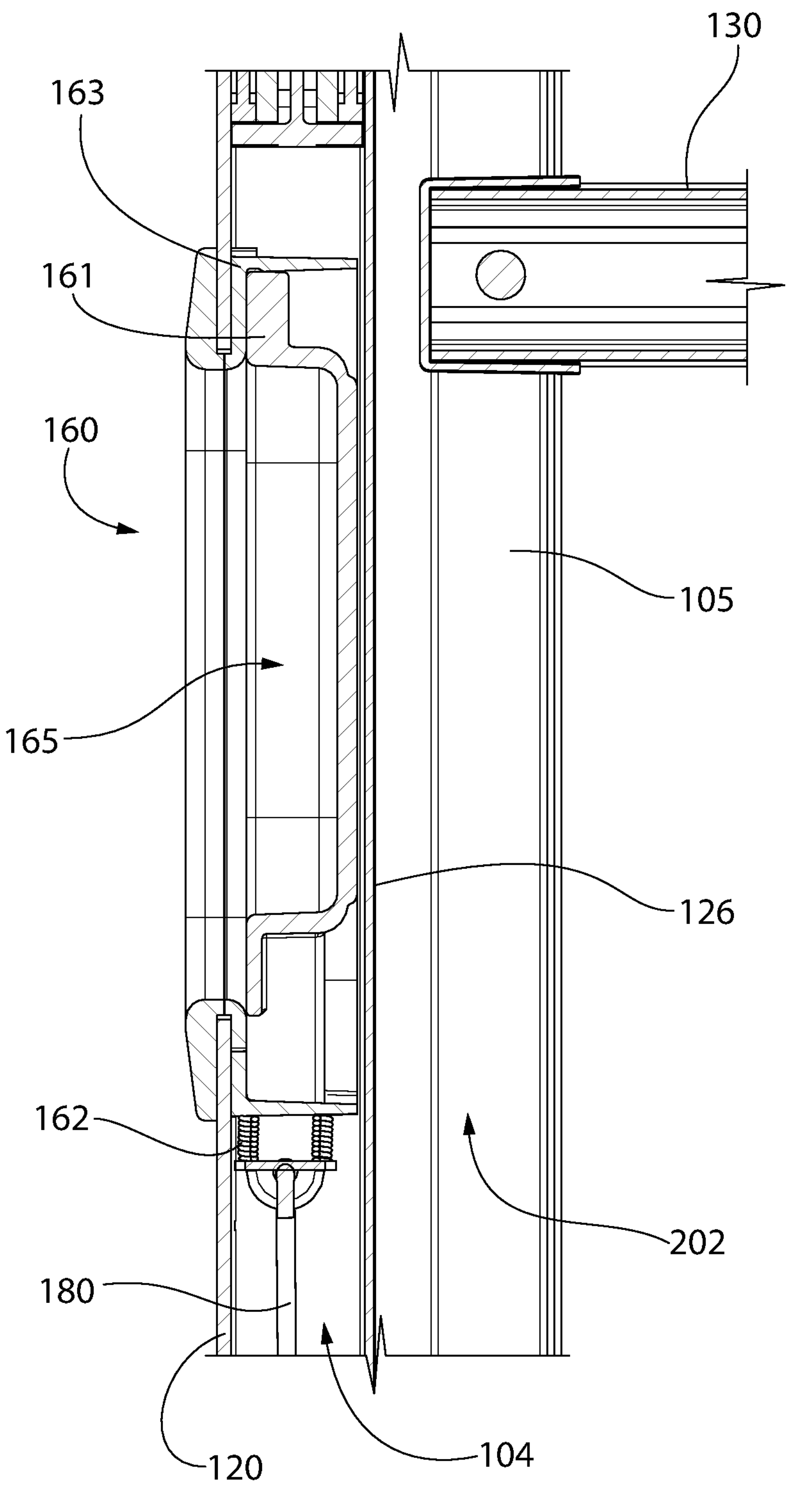
FIG. 18 is the close up view of FIG. 17 illustrating the actuator in a second state.
Figure 20:
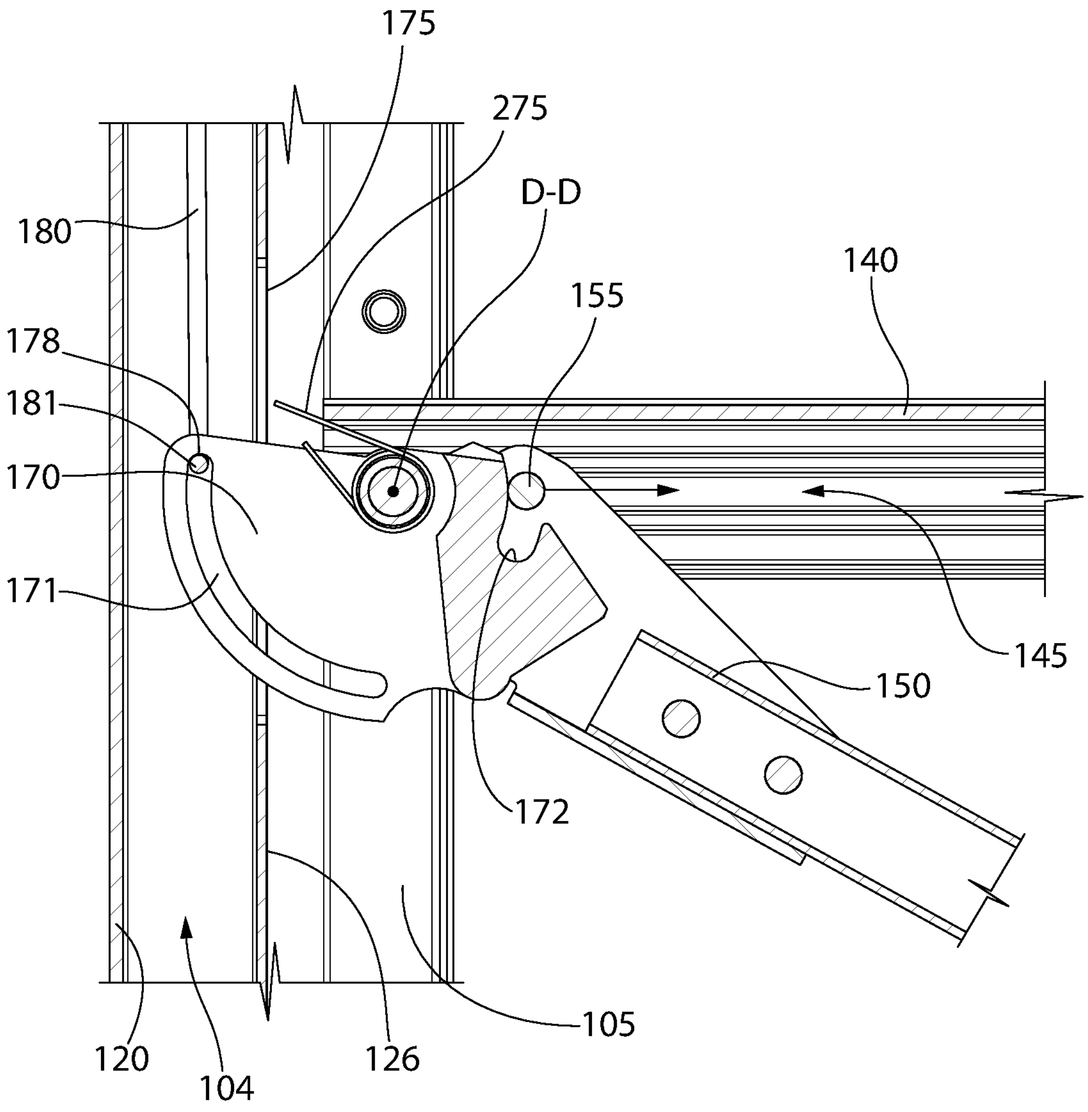
FIG. 20 is the close-up view of FIG. 18 illustrating the locking member in the unlocked state.

Referring now to FIGS. 18 and 20, the actuator 160 is illustrated as being moved to the second state and the locking member 170 is illustrated as having been pivoted to the unlocked state. To alter the actuator 160 from the first state to the second state, a user engages the trigger 161 and pulls upwardly on the trigger 161, thereby producing an actuation force on the trigger 161 in an axial upward direction towards the first and second locking hinges 115, 125 (i.e., away from the first end 121 of the second side rail 120). In doing this, the resilient element 162 compresses and the trigger 161 moves axially upward within the housing 163. Because the trigger 161 is operably coupled to the linkage 180, the linkage 180 also moves axially upward, thereby overcoming the bias of the resilient element 275 and causing the locking member 170 to pivot about axis D-D from the locked state (FIG. 19) to the unlocked state (FIG. 20). During this motion, the second end 181 of the linkage 80 engages an end wall 178 of the elongated slot 171, thereby causing the locking member 170 to pivot about axis D-D as the actuator 160 is moved form the first state to the second state.

In order to alter the locking assembly 190 from the locked state (FIG. 19) to the unlocked state (FIG. 20) the force applied to the user-operated actuator 160 in the upward axial direction must overcome the biasing force of both of the resilient elements 162, 275. Upon a user releasing the trigger 161, the trigger 161 will automatically alter back from the second state of FIG. 18 to the first state of FIG. 17. This is because the resilient element 162 and the resilient element 275 are biased to return to their normal state.

Figure 21:
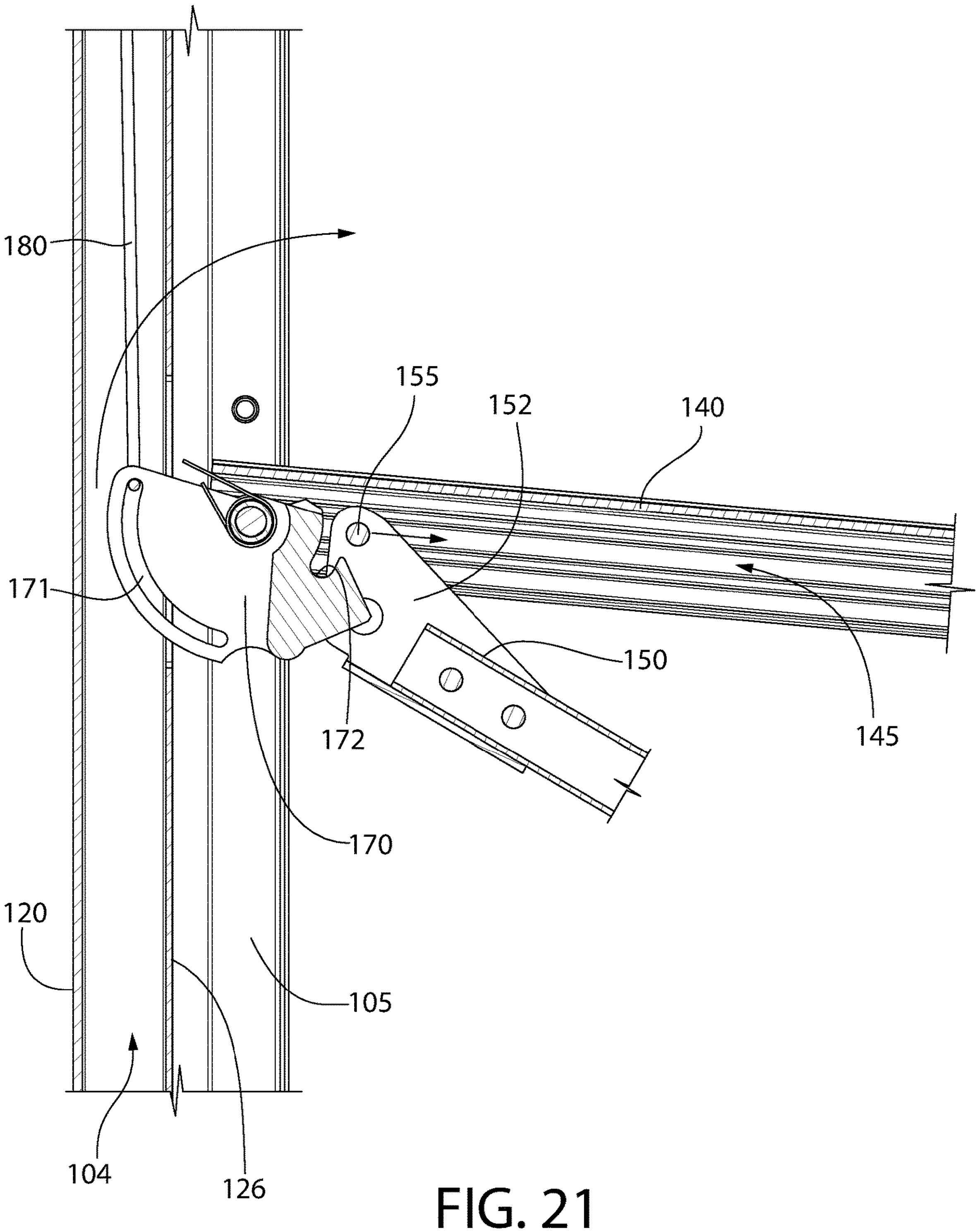
FIGS. 21-23 are close-up views of FIG. 20 sequentially illustrating the process of altering the ladder from the non-collapsed configuration of FIG. 12 to the collapsed configuration of FIG. 13.
Figure 22:
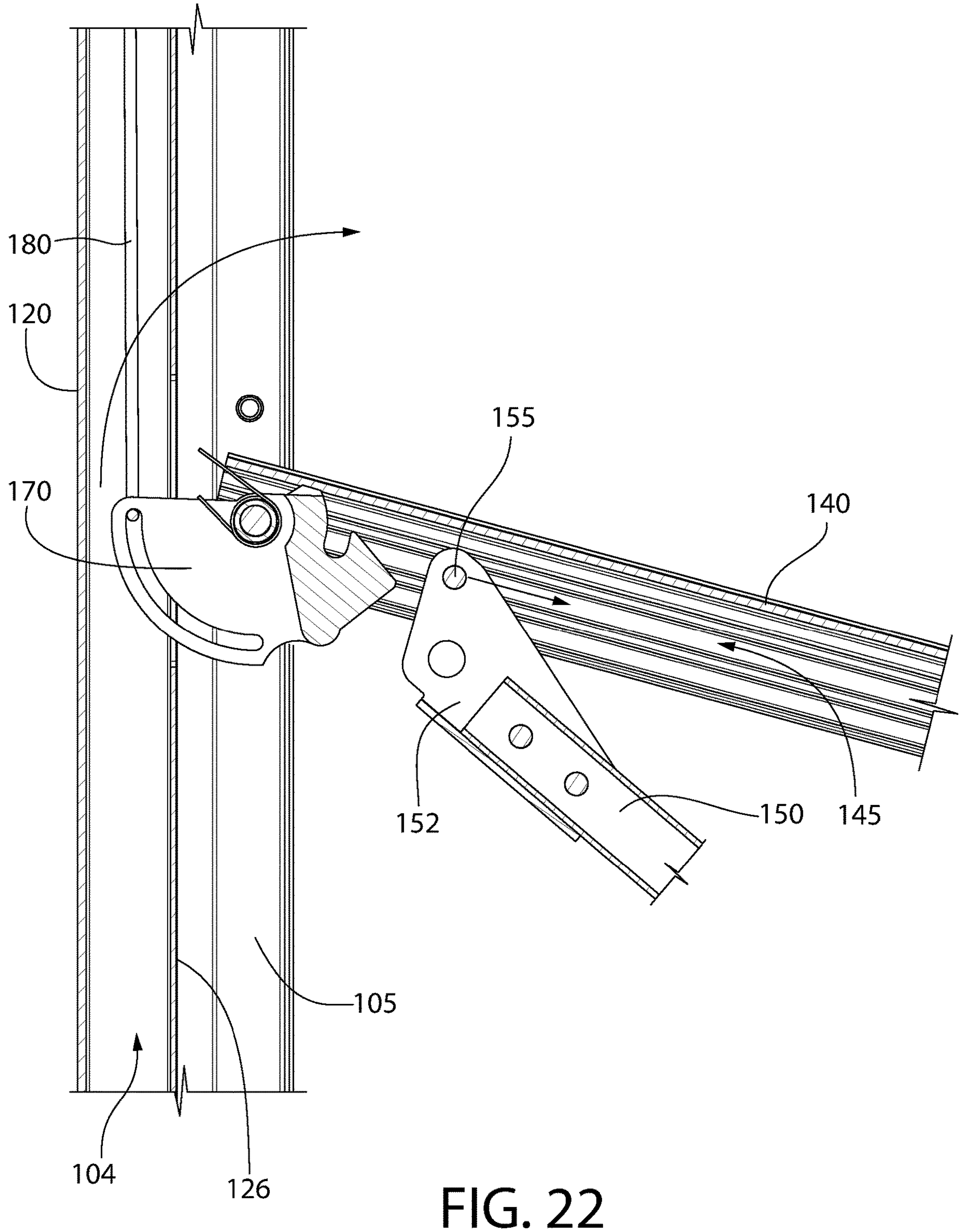
Figure 23:
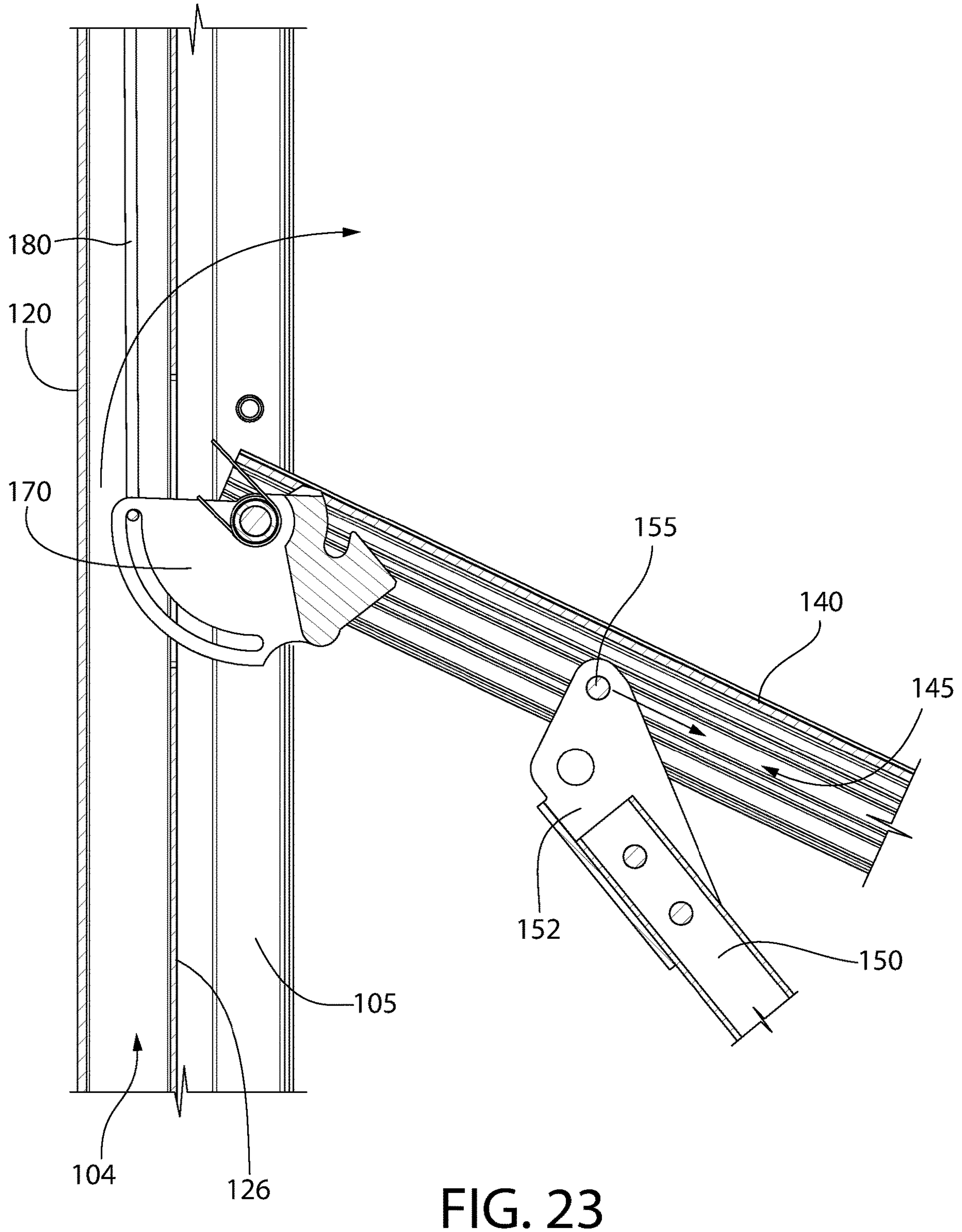

Referring now to FIGS. 21-23, once the locking assembly 190 (via rotation of the locking member 170) achieves the unlocked state, continued application of the force to the first user-operated actuator 160 in the upward axial direction causes the second side rail 120 to lift relative to and fold toward the first side rail 110. As a result, the first ladder section 300 can be altered from the load bearing ladder state (FIG. 12) to the rail-to-rail collapsed state (FIG. 13). As mentioned earlier, due their coupling, the second ladder section 400 will also be altered from the load bearing ladder state (FIG. 12) to the rail-to-rail collapsed state (FIG. 13).

As the user raises the second side rail 120 relative to the first side rail 110 (and folds the second side rail 120 towards the first side rail 110), the locking bar 150 will being to slide within the track 145 of the locking bar 140 in a direction away from the locking member 170. During this movement, the second side rail 120 moves towards the first side rail 110 by pivoting each of the non-locking rails 130 and the locking rail 140 about their respective pivot axes. As shown in FIG. 21 as the second side rail 120 is being lifted relative to the first side rail 110, the second end 152 of the locking bar 150 slides within the track 145 of the locking rung 140 in a direction away from the locking member 170 and also away from the second side rail 120 and towards the first side rail 110. Once the locking component 155 of the locking bar 150 has moved out of alignment with the engagement feature 172, the user can release the actuator 160. Because the locking component 155 of the locking bar 150 has moved away from the engagement feature 172, releasing the actuator 160 will not lock the locking assembly 190. FIGS. 22 and 23 illustrate the continued sliding movement of the second end 152 of the locking bar 150 within the track 145 of the locking rung 140 as the second side rail 120 continues to be moved towards the first side rail 110. The second end 152 of the locking bar 150 moves further and further away from the locking member 170 and the second rail 120 to facilitate the collapse of the ladder 110. Because each of the non-locking rungs 130 are freely pivotably coupled to the first and second side rails 110, 120, once the locking assembly 190 is altered into the unlocked state there is nothing to prevent a user from collapsing the ladder 100 as described herein.

It should be appreciated that the ladder 100 will not alter into its collapsed state automatically. Rather, user action is needed to move the second side rail 120 towards the first side rail 110 as described herein. This is because the locking bar 150 has a moment of inertia that keeps the locking bar 150 in the locked position (the position at which it can be coupled to the locking member 170). A user must take action to move the locking bar 150 away from the locked position, such action being lifting/pivoting the second side rail 120 towards the first side rail. As seen in the figures and described herein, the same upward actuation motion that takes place to actuate the actuator 160 is also used to facilitate the rail-to-rail collapsing of the ladder 100.

Figure 28:
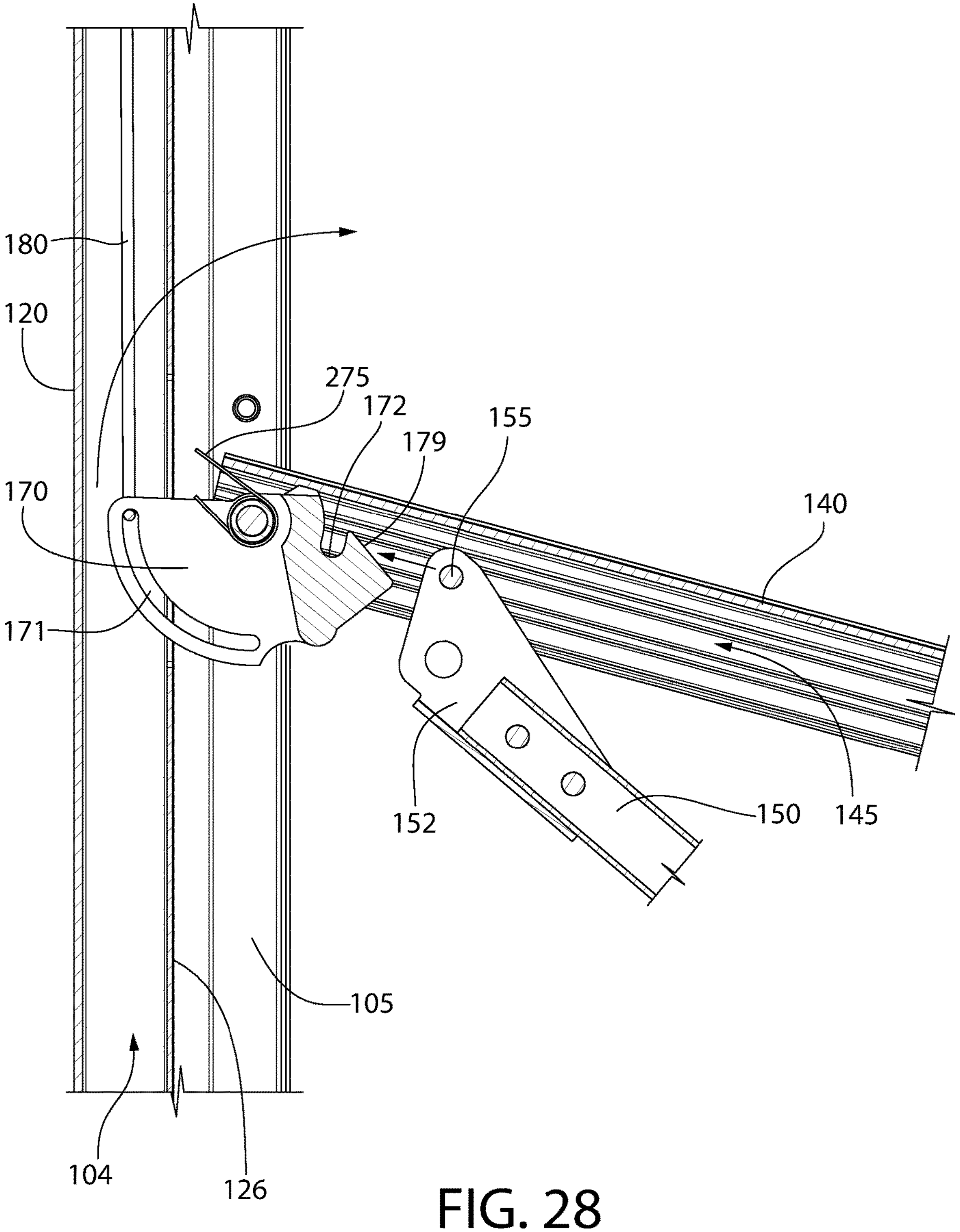
FIG. 28 is a close-up view of the locking assembly as the ladder begins to be altered from the rail-to-rail collapsed state to the load bearing ladder state.
Figure 29:
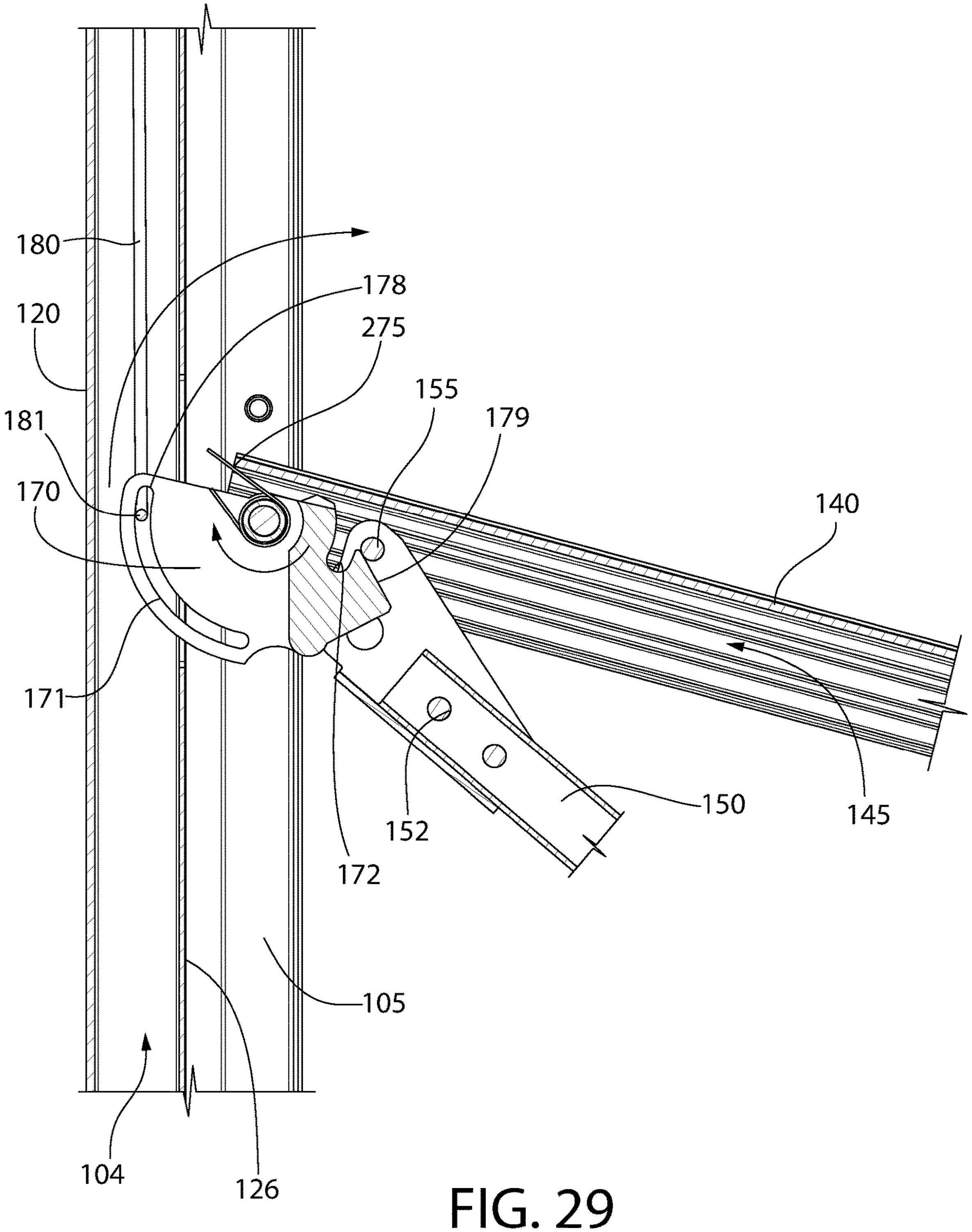
FIG. 29 is a close-up view of the locking assembly as the locking component of the locking bar contacts the cam surface of the locking member to impart an opening force on the locking member that causes the locking member to pivot.
Figure 30:
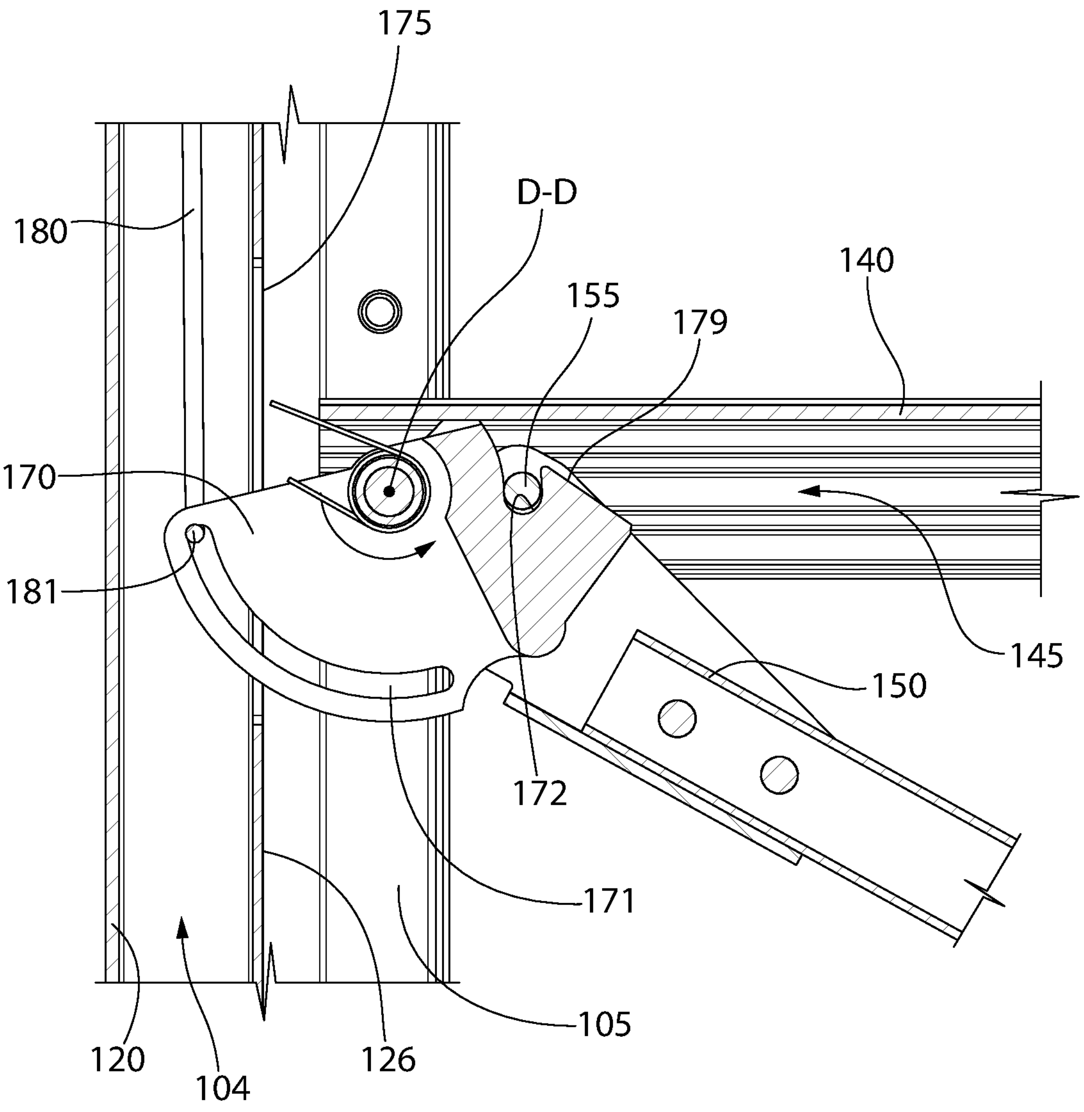
FIG. 30 is close-up view of the locking assembly after the locking component has ridden over the cam surface and the locking member is biased back into the locking state.

Referring now to FIGS. 28-30, the process by which the locking assembly 190 assumed the locked state as the first ladder section 300 is altered from the rail-to-rail collapsed state to the load bearing ladder state will be described. Referring to FIG. 28, as the first ladder section 300 is altered from the rail-to-rail collapsed state to the load bearing ladder state, the second side rail 120 is lowered and folded away from the first side rail 110. As a result, the second end 152 of the locking bar 150 begins to slide within the track 145 of the locking rung 140 toward the second side rail 120 as indicated by the motion arrow. Referring to FIG. 29, this sliding continues unobstructed until the locking component 155 of the locking bar 150 contacts a cam surface 179 of the locking member 170. As the lowering and folding away of the second side rail 120 relative to the first side rail 110 continues, the locking component 155 exerts an opening force to the cam surface 179 of the locking member 170, thereby overcoming the bias of the resilient element 275 and causing the locking member 170 to pivot about the axis D-D. However, because the second end 181 of the linkage 180 can slide freely within the arcuate slot 171, the locking member 170 pivots from the locked state toward the unlocked state while the actuator 160 remains in the first state. In other words, the opening force must only overcome the biasing force of the resilient element 275 (and not the combined bias of both the resilient elements 275, 162) to alter the locking assembly 190 from the locked state to the unlocked state. This is different than the actuation force applied to the actuator 160, which must overcome the combined bias of both the resilient elements 275, 162 to alter the locking assembly 190 from the locked state to the unlocked state.

The locking component 155 continues to ride along the cam surface 179 (and rotate the locking member 170) until the locking component 155 is aligned with the engagement feature 172. Once this happens, the bias of resilient element 275 rotates the locking member 170 back into the locked state, thereby forcing the locking component 155 into engagement with the engagement feature 172, as shown in FIG. 30.

Generally speaking, the locking bar 150 extends from a first end 151 that is pivotably coupled to the first side rail 110 to a second end 152 that is slidably coupled to the locking rung 140 within the track 145 of the locking rung 140. With the ladder 100 in the load bearing ladder state (as shown in FIG. 9), the locking bar 150 extends obliquely relative to the first and second axes A-A, B-B (and hence also relative to the first and second side rails 110, 120). As described above, the locking bar 150 comprises a locking component 155 that both slides within the track 145 and engages the locking member 170 to lock the ladder 100 in the load bearing ladder state. In the exemplified embodiment, the locking component 155 is a rod that nests within channels of the track 145 located on opposing sidewalls so that the locking bar 150 remains coupled to the locking rung 140 regardless of the specific position of the locking component 155 relative to the locking rung 140. Thus, regardless of whether the ladder 100 is in the load bearing ladder state or the rail-to-rail collapsed state (FIG. 10), the locking bar 150 remains slidably coupled to the locking rung 140.

In FIG. 9, the ladder 100 is in a straight ladder configuration. In this configuration, the first and second side rails 110, 120 are spaced apart from one another by a first distance D1. In the straight ladder configuration, the ladder 100 is ready for use as a conventional ladder. The ladder 100 in this configuration is very stable for use.

As mentioned above, the actuator 160 is operably coupled to the locking member 170. In the exemplified embodiment, the actuator 160 is operably coupled to the locking member 170 via the cable 180 that extends along the first side rail 110, but other structural arrangements for this coupling may be possible in alternative embodiments. The actuator 160 is alterable between a first state, as shown in FIGS. 9 and 15, whereby the locking member 170 is coupled to the locking bar 150 so that the locking assembly 190 is in a locked state, and a second state, as shown in FIG. 19 described below, whereby the locking member 170 is decoupled from the locking bar 150 so that the locking assembly 190 is in an unlocked state. In the exemplified embodiment, the actuator 160 comprises a trigger 161 and pulling upwardly on the trigger 161 in a direction opposite gravity (or, in the exemplified embodiment, in a direction towards the second locking hinge 125) transitions the actuator 160 from the first state to the second state. Stated another way, the actuator 160 is actuated by pulling the trigger 161 in a direction away from the first end 121 of the second side rail 120 (and also away from the locking rung 140 and away from the locking bar 150).

In the exemplified embodiment, the actuator 160 is located on an upper region of the first portion 123 of the second side rail 120 adjacent to the second locking hinge 125. Thus, if the first portion 123 of the second side rail 120 were divided into thirds, the actuator 160 would be located on the upper third of the first portion 123 of the second side rail 120. Furthermore, in the exemplified embodiment, the actuator 160 is located on the outer surface 127 of the second side rail 120. This positioning of the actuator 160 makes it very accessible for actuation to alter the ladder 100 between the non-collapsed and collapsed states. However, the requirement that the trigger 161 be pulled upwardly away from the locking rung 140 makes it so that the trigger 161 is unlikely to be actuated accidently, which is a safety feature.

Figure 10:
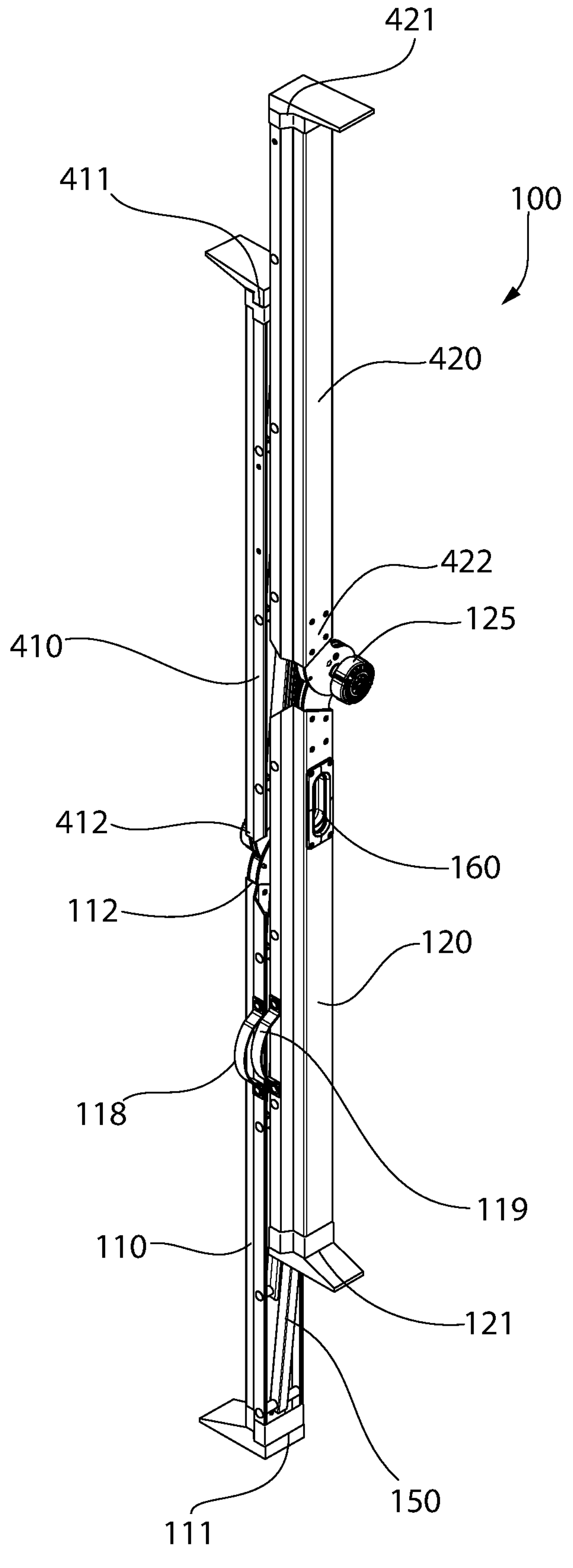
FIG. 10 is a perspective view of the ladder of FIG. 9 in an extended and collapsed configuration.

Referring to FIG. 10, as mentioned above the ladder 100 can be altered into the rail-to-rail collapsed state directly from the straight ladder configuration shown in FIG. 9. Specifically, by actuating the actuator 160, the locking bar 150 can be decoupled from the locking member 170 so that the first and second side rails 110, 120 can be moved closer to one another. During this process, the non-locking rungs 130 and the locking rungs 140 pivot relative to the first and second side rails 110, 120 as the second side rail 120 is moved towards the first side rail 110. When in the collapsed state, the first and second side rails 110, 120 are spaced apart by a second distance D2 that is less than the first distance D1 and could be a distance of zero in some embodiments. Furthermore, in the collapsed state the second side rail 120 is raised longitudinally relative to the first side rail 110 so that the first ends 111, 121 of the first and second side rails 110, 120 are offset from one another and the second ends 112, 122 of the first and second side rails 110, 120 are offset from one another, as shown in FIG. 10.

FIG. 11 illustrates the ladder 100 in the step ladder configuration. Specifically, the first and second locking hinges 115, 125 can be actuated to allow the first and second ladder section 300, 400 to fold about the rotational axis C-C. As shown in several of the figures, the ladder 100 comprises a foot 199 coupled to the bottom ends of the first, second, third, and fourth side rails 110, 120, 410, 420. In order to qualify as a step ladder under ANSI standards, the ladder 100 has the required minimum flare per length of the rails. For example, the ladder 100 has at least a 1.25 inch flare per foot of side rail. Thus, the feet 199 are intended to increase the base width of the first and second ladder section 300, 400 to satisfy the step ladder safety standards.

Figure 24:
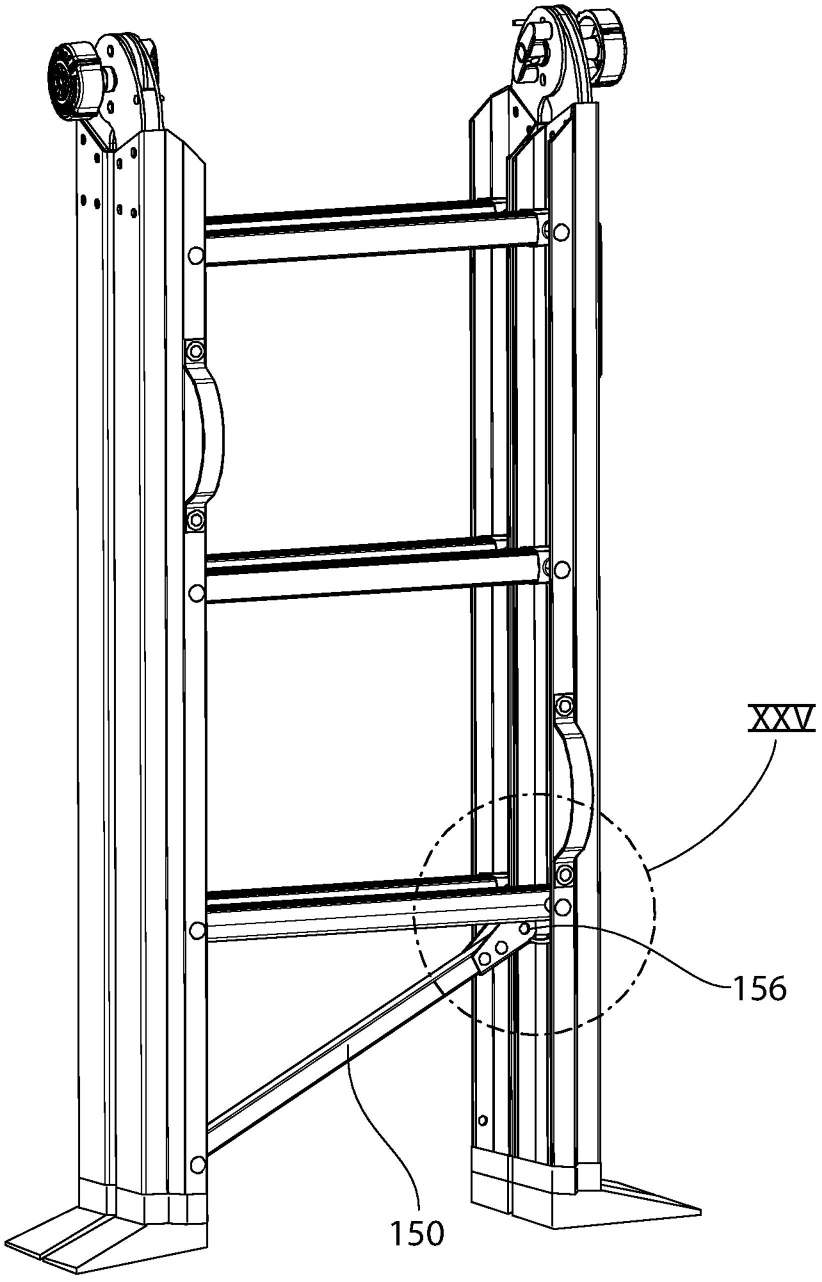
FIG. 24 is another perspective view of the ladder of FIG. 9 in the folded and non-collapsed configuration.
Figure 25:
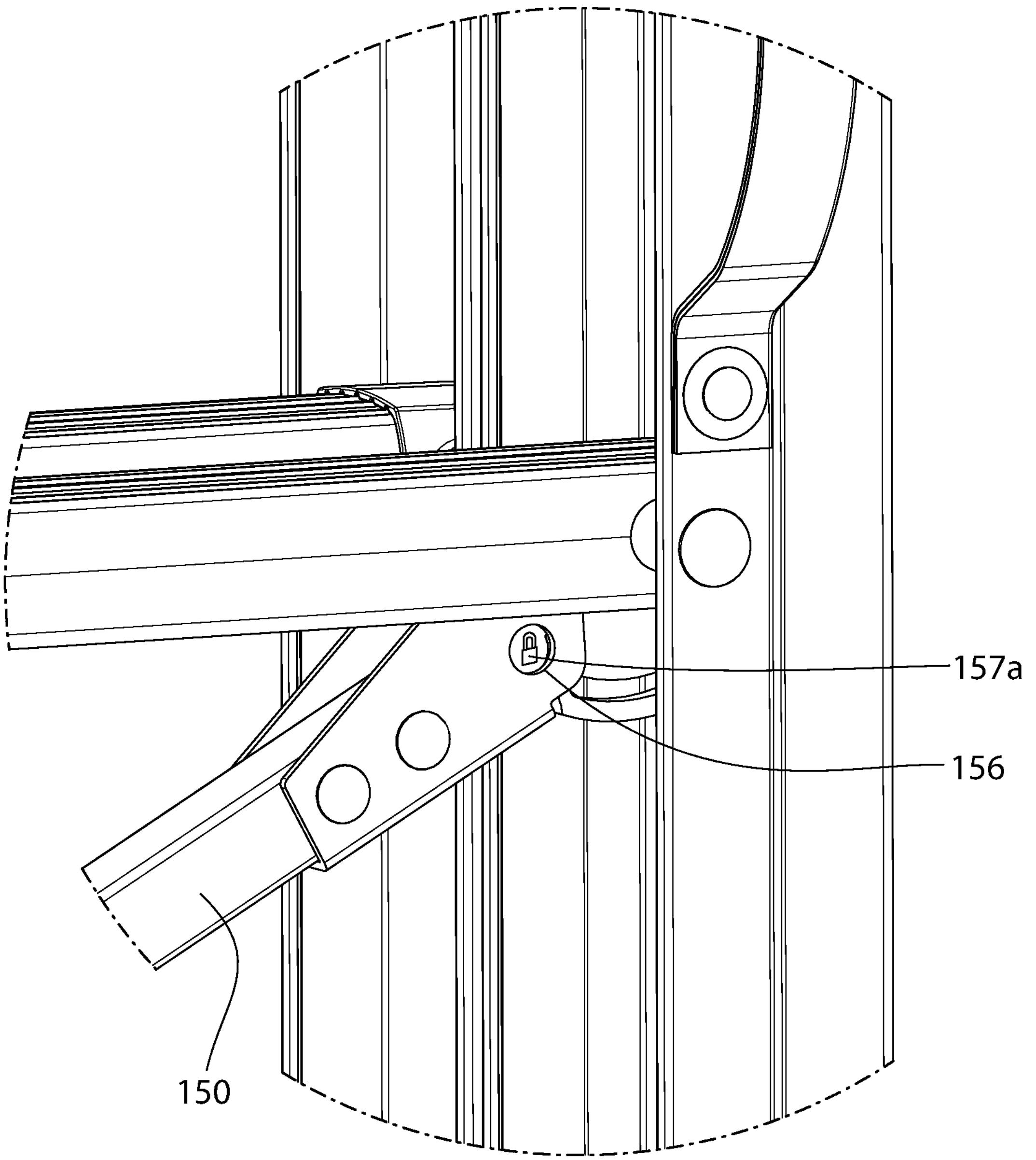
FIG. 25 is a close-up view of area XVII of FIG. 24 with the locking member in the locked state.
Figure 26:
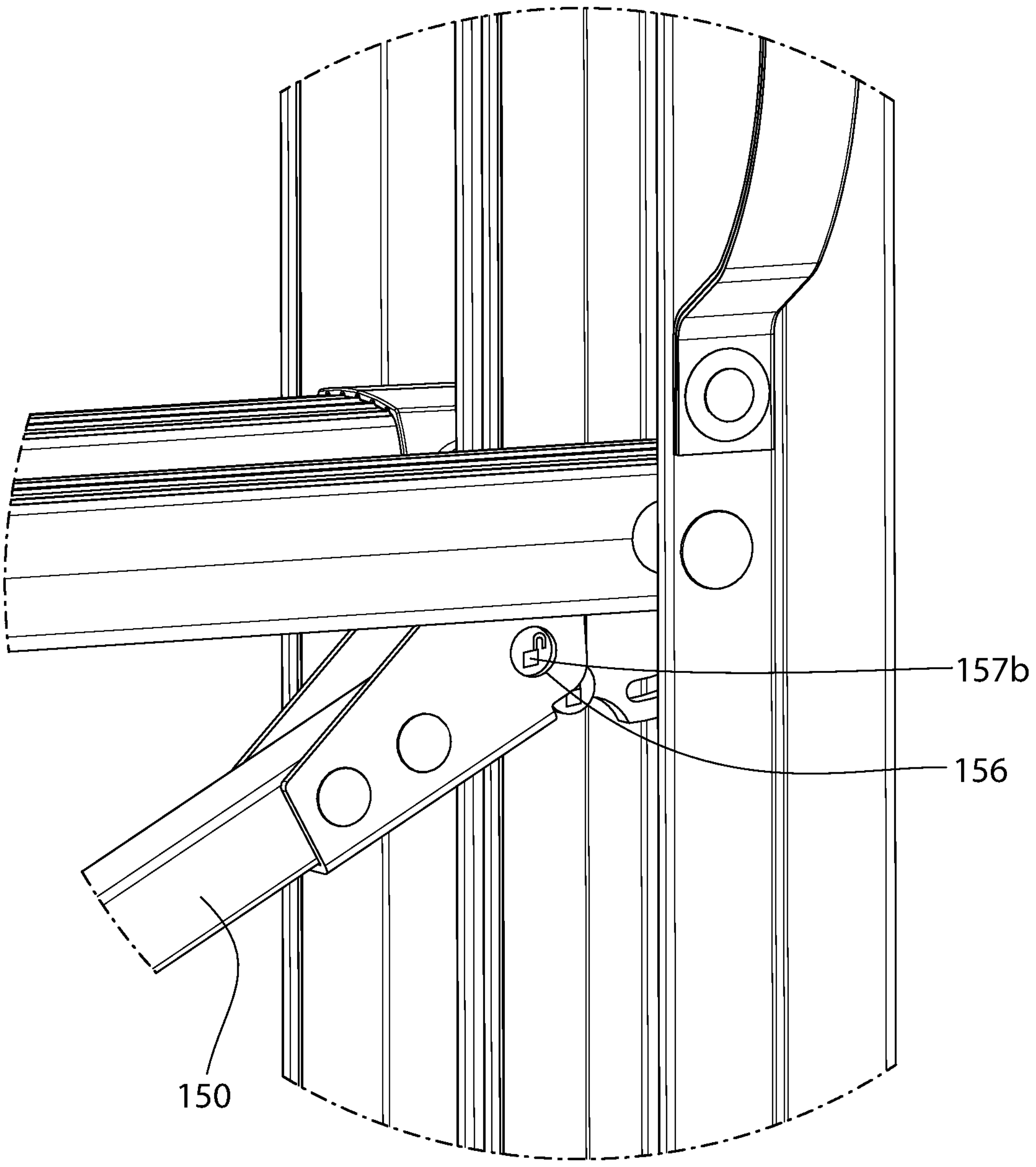
FIG. 26 is a close-up view of area XVII of FIG. 24 with the locking member in the unlocked state.

Referring to FIGS. 24-26, another feature of the ladder 100 will be described. In the exemplified embodiment, the locking bar 150 comprises an aperture 156 through which a portion of the locking member 170 is exposed. More specifically, the portion of the locking member 170 that is exposed through the aperture 156 comprises an indicium. FIG. 25 illustrates the first indicia 157*a* that is visible through the aperture 156 when the locking assembly 190 is in the locked state. FIG. 18 illustrates the second indicia 157*b* that is visible through the aperture 156 when the locking assembly 190 is in the unlocked state. In the exemplified embodiment, the first indicia 157*a* is an image of a padlock in a locked state and the second indicia 157*b* is an image of a padlock in an unlocked state. Of course, the invention is not to be limited to these specific indicia. In other embodiments, the first indicia 157*a* may be a first color (i.e., red) and the second indicia 157*b* may be a second color (i.e., green) that is different than the first color. The first and second indicia 157*a*, 157*b* are meant to indicate to a user whether the locking assembly 190 is in the locked state or the unlocked state so that the user knows whether he can collapse the ladder and/or safely use it in a conventional manner.

The ladder 100 may come in various different sizes, including, for example without limitation, five foot, seven foot, nine foot, eleven foot, etc., measured from the first ends 111, 121 of the first and second rails 110, 120 to the second ends 112, 122 of the first and second rails 110, 120. The ladder 100 could be less than five foot or more than eleven foot in some embodiments. The ladder 100 could be identical to that which has been described herein regardless of the length of the ladder, in some embodiments.

Figure 27A:
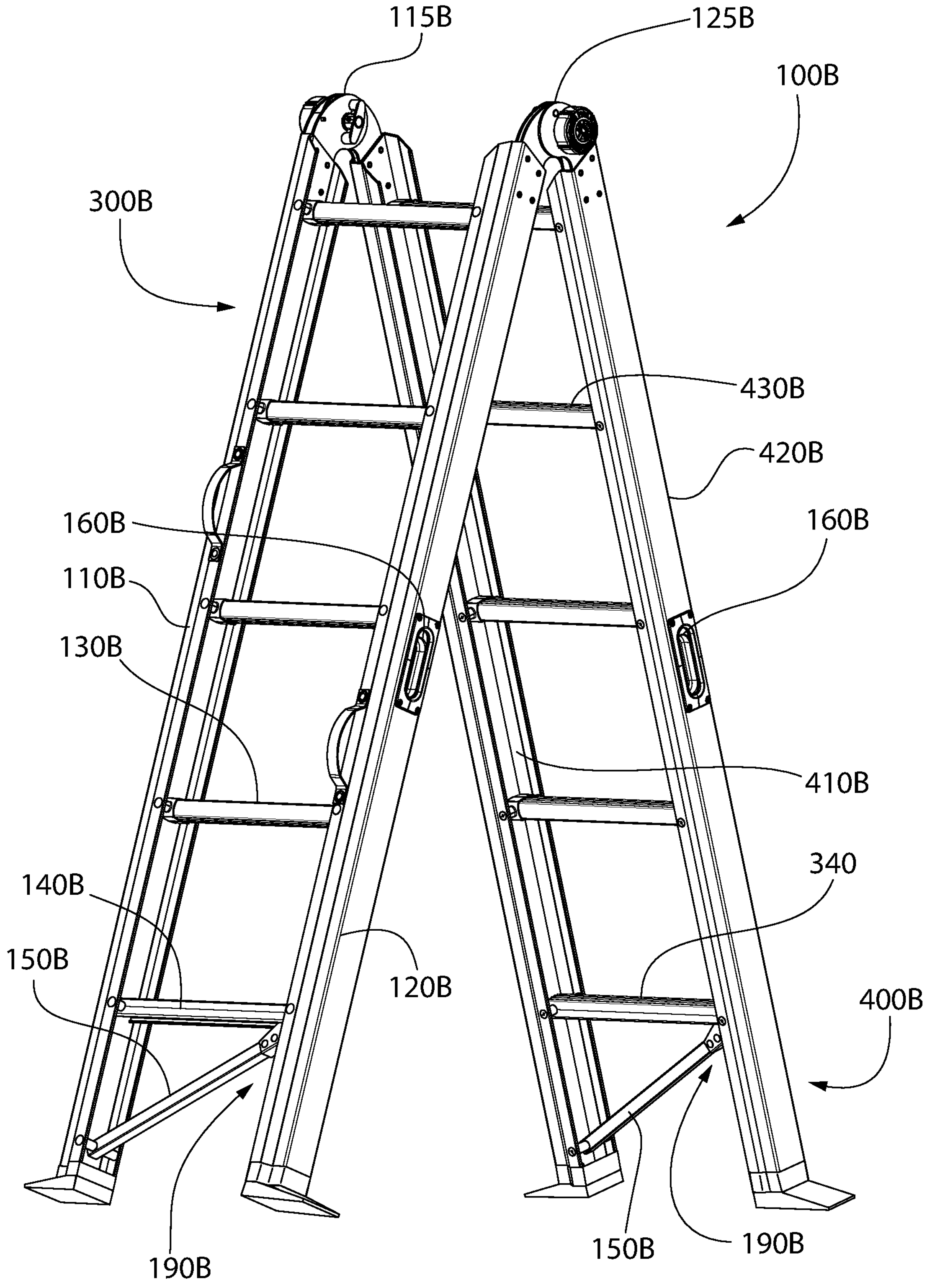
FIG. 27 is a perspective view of a ladder in a step ladder configuration in accordance with an alternative embodiment of the present invention.
Figure 27B:
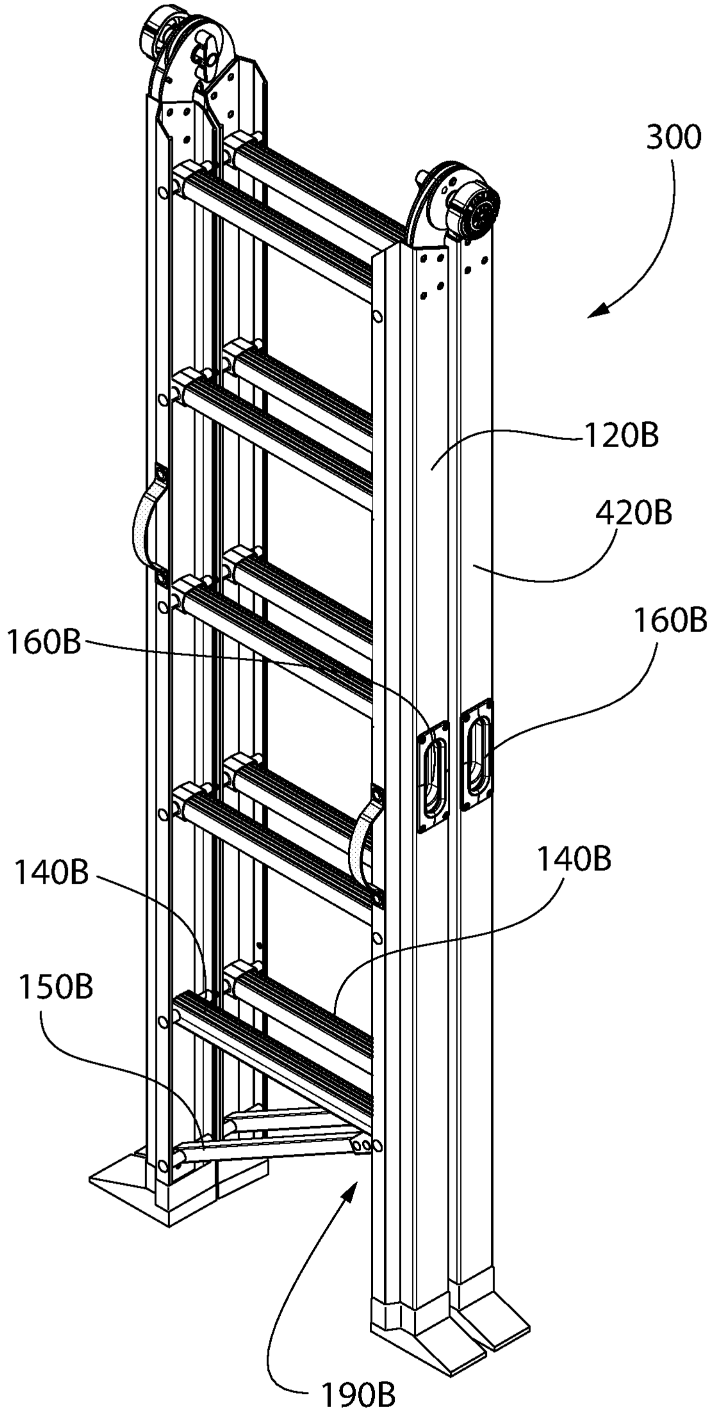

Referring briefly to FIGS. 27A-B, a ladder 100B is illustrated in accordance with one alternative embodiment whereby the ladder 100B is of a greater length than the ladder 100. The ladder 100B is structurally and functionally identical to the ladder 100 except that the ladder 100B includes two locking assemblies 390B and two actuators 160B. The locking assemblies 390B and the actuators 160B are identical, both structurally and functionally, to the locking assembly 190 and the actuator 160 of the ladder 100 described above. Thus, a detailed description of these elements and other elements of the ladder 100B will be omitted with the understanding that the discussion above for the ladder 100 is applicable to the ladder 300B (unless otherwise stated below).

In FIG. 27A, the ladder 100B is shown in the step ladder configuration while, in FIG. 27B, the ladder 100B is shown in the folded configuration. As can be seen, both the first ladder section 300B and the second ladder section 400B comprises their own locking assembly 190B and actuator 160B. The locking assembly 190B and the actuator 160B on the second ladder section 100B operates the same for the third and fourth side rails 410B, 420B as that discussed above with respect to ladder 100 for the first and second side rails 110, 120.

A first one of the actuators 160B is located on the second side rail 120B while a second one of the actuators 160B is located on the fourth side rail 420B. The actuators 160B are positioned on the second and fourth side rails 120B, 420B so that upon the ladder 100B being altered into the folded configuration (FIG. 27B), the actuators 160B are at least partially aligned with one another in the axial direction. In the exemplified embodiment, the actuators 160B are fully aligned with one another. The first one of the actuators 160B is located on an outer surface of the second side rail 120B and the second one of actuators 160B is located on an outer surface of the fourth side rail 420B. In the folded configuration, the first and second ones of the actuators 160B are adjacent one another.

Although the actuators 360 for the two locking assemblies 390 are shown positioned on the same side of the ladder 300 in FIGS. 27A-B, they could be positioned on opposing sides of the ladder 300 in other embodiments. Increasing the number of locking assemblies 390 increases the stability of the ladder 300 to accommodate for the increase in length of the ladder 300.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A ladder comprising:

a first ladder section comprising:

a first side rail extending along a first axis and comprising an outer surface and a front surface;

a second side rail extending along a second axis and comprising an outer surface and a front surface, the outer surface of the second side rail facing an opposite direction than the outer surface of the first side rail;

a plurality of non-locking rungs having a first end pivotably coupled to the first side rail and a second end pivotably coupled to the second side rail;

a first handle on the front surface of the first side rail;

a second handle on the front surface of the second side rail;

a locking assembly alterable between: (1) a locked state in which the first ladder section is locked in a load bearing ladder state; and (2) an unlocked state in which the second side rail can be shifted relative to the first side rail to alter the first ladder section between the load bearing ladder state and a rail-to-rail collapsed state;

a user-operated actuator located on the outer surface of the second side rail and operably coupled to the locking assembly, the user-operated actuator configured to alter the locking assembly from the locked state to the unlocked state upon being moved from a first state to a second state; and wherein in the load bearing ladder state the first and second handles are offset from one another in an axial direction and in the rail-to-rail collapsed state the first and second handles are at least partially aligned with one another in the axial direction.

2. The ladder according to claim 1 further comprising:

in the load bearing state, the first and second side rails being substantially parallel to and spaced from one another a first distance and the plurality of non-locking rungs being substantially perpendicular to the first and second side rails; and in the rail-to-rail collapsed state, the first and second side rails being substantially parallel to and spaced from one another a second distance and the plurality of non-locking rungs being inclined relative to the first and second side rails, the first distance being greater than the second distance.

3. The ladder according to claim 1 wherein, in the rail-to-rail collapsed state, the first and second handles are in substantially complete alignment with one another in the axial direction.

4. The ladder according to claim 1 wherein the first handle is located a first distance from a bottom end of the first side rail and the second handle is located a second distance from a bottom end of the second side rail, the first distance being greater than the second distance.

5. The ladder according to claim 1 further comprising:

at least one locking rung pivotably coupled to the first and second side rails, the at least one locking rung comprising a track;

the locking assembly comprising a locking bar having a locking component and a locking member having an engagement feature, the locking bar being slidably coupled to the at least one locking rung within the track of the at least one locking rung, the locking assembly alterable between: (1) the locked state in which the locking component of the locking bar is engaged with the engagement feature of the locking member to prevent the locking component of the locking bar from sliding within the track of the locking rung, thereby locking the first ladder section in the load bearing ladder state; and (2) an unlocked state in which the locking component of the locking bar is disengaged from the engagement feature of the locking member so that the locking component of the locking bar can slide within the track of the locking rung to shift the second side rail relative to the first side rail to alter the first ladder section between the load bearing ladder state and the rail-to-rail collapsed state;

the user-operated actuator operably coupled to the locking member, and wherein actuation of the user-operated actuator causes the locking member to pivot to alter the locking assembly from the locked state to the unlocked state; and wherein the user-operated actuator is biased into the first state.

6. The ladder according to claim 1 further comprising:

the user-operated actuator configured to move from the first state to the second state upon a force being applied to the user-operator actuator in an upward axial direction moving from a bottom end of the second side rail toward a top end of the second side rail; and wherein, upon the locking assembly assuming the unlocked state, continued application of the force in the upward axial direction causes pivoting about the first and second ends of the plurality of non-locking rungs to cause the second side rail to shift toward the first side rail, thereby altering the first ladder section from the load bearing ladder state to the rail-to-rail collapsed state.

7. The ladder according to claim 1 further comprising:

at least one locking rung pivotably coupled to the first and second side rails, the at least one locking rung comprising a track;

the locking assembly comprising a locking bar and a locking member, the locking bar slidably coupled to the at least one locking rung within the track, the locking bar comprising a locking component that engages the locking member when the first ladder section is in the load bearing ladder state and the locking assembly is in the locked state; and wherein the user-operated actuator is operably coupled to the locking member so that activation of the user-operated actuator pivots the locking member to disengage the locking component from the locking member to allow the locking bar to slide within the locking track as the first ladder section is altered from the load bearing ladder state to the rail-to-rail collapsed state.

8. A ladder comprising:

a first ladder section comprising:

a first side rail extending along a first axis;

a second side rail extending along a second axis;

a plurality of first rungs having a first end pivotably coupled to the first side rail and a second end pivotably coupled to the second side rail;

a locking assembly alterable between: (1) a locked state in which the first ladder section is locked in a load bearing ladder state; and (2) an unlocked state in which the second side rail can be shifted relative to the first side rail to alter the first ladder section between the load bearing ladder state and a rail-to-rail collapsed state;

a user-operated actuator located on the second side rail and operably coupled to the locking assembly to alter the locking assembly from the locked state to the unlocked state upon a force being applied to the user-operated actuator in an upward axial direction moving from a bottom end of the second side rail toward a top end of the second side rail, the user-operated actuator alterable between a first state and a second state, wherein moving the user-operated actuator from the first state to the second state alters the locking assembly from the locked state to the unlocked state;

a first resilient element that biases the user-operated actuator into the first state; and a second resilient element that biases the locking assembly into the locked state; and wherein, upon the locking assembly assuming the unlocked state, continued application of the force to the user-operated actuator in the upward axial direction causes pivoting about the first and second ends of the plurality of first rungs to cause the second side rail to lift and shift toward the first side rail, thereby altering the first ladder section from the load bearing ladder state to the rail-to-rail collapsed state.

9. The ladder according to claim 8 wherein the user-operated actuator is configured to alter the locking assembly from the locked state to the unlocked state upon being moved from a first state to a second state; and wherein the user-operated actuator is biased into the first state by the first resilient element.

10. The ladder according to claim 8 further comprising:

each of the first and second side rails comprising an outer surface;

the user-operate actuator comprising a slide trigger;

a depression in the outer surface of the second side rail, the slide trigger nested within the depression.

11. The ladder according to claim 10 further comprising a linkage connecting the slide trigger to the locking assembly.

12. The ladder according to claim 10 further comprising:

the second side rail comprising a second enclosed channel, the second enclosed channel defined by a second outer wall comprising the outer surface of the second side rail, a second inner wall, a second front wall and a second rear wall; and the slide trigger and the linkage disposed within the second enclosed channel.

13. The ladder according to claim 12 further comprising:

a locking member of the locking assembly pivotably coupled to the second side rail and comprising a first portion located within the second enclosed channel and a second portion protruding from the second inner wall;

the linkage coupled to the first portion of the locking member; and the second portion of the locking member comprising an engagement feature that engages a locking component of a locking bar of the locking assembly, the locking bar having a first end pivotably coupled to the first side rail and second end slidably coupled to one of the plurality of first rungs.

14. The ladder according to claim 8 further comprising:

wherein the force applied to the user-operated actuator in the upward axial direction must overcome the biasing force of both of the first and second resilient elements to alter the locking assembly from the locked state to the unlocked state.

15. The ladder according to claim 14 further comprising:

wherein the locking assembly can be altered from the locked state to the unlocked state by an opening force applied directly to the locking member by a locking component of a locking bar;

wherein the opening force must only overcome the biasing force of the second resilient element to alter the locking assembly from the locked state to the unlocked state.

16. The ladder according to claim 8 further comprising:

a linkage connecting the user-operated actuator to the locking assembly;

a locking member of the locking assembly comprising an elongated slot in which a second end of the linkage is operably engaged;

the second end of the linkage engaging an end wall of the elongated slot when the user-operated actuator is altered from the first state to the second state to pivot the locking member; and the second end of the linkage sliding freely in the elongate slot when the locking component of the locking bar applies the opening force to the locking member.

17. A ladder comprising:

a first ladder section comprising:

a first side rail extending along a first axis;

a second side rail extending along a second axis;

a plurality of non-locking rungs having a first end pivotably coupled to the first side rail and a second end pivotably coupled to the second side rail;

at least one locking rung having a first end pivotably coupled to the first side rail and a second end pivotably coupled to the second side rail, the at least one locking rung comprising a track;

a locking assembly comprising a locking bar and a locking member, the locking bar slidably coupled to the at least one locking rung within the track, the locking assembly alterable between: (1) a locked state in which the first ladder section is locked in a load bearing ladder state; and (2) an unlocked state in which the second side rail can be shifted relative to the first side rail to alter the first ladder section between the load bearing ladder state and a rail-to-rail collapsed state;

a user-operated actuator comprising a slide trigger, the user-operated actuator located on the second side rail and operably coupled to the locking member by a linkage, the locking member pivotable about a pivot axis to alter the locking assembly from the locked state to the unlocked state upon a force being applied to the slide trigger of the user-operated actuator in an upward axial direction moving from a bottom end of the second side rail towards a top end of the second side rail; and wherein, upon the locking assembly assuming the unlocked state, continued application of the force to the slide trigger of the user-operated actuator in the upward axial direction causes pivoting about the first and second ends of the plurality of non-locking rungs and the at least one locking lung to cause the second side rail to lift and shift toward the first side rail, thereby altering the first ladder section from the load bearing ladder state to the rail-to-rail collapsed state.

18. The ladder according to claim 17 further comprising:

the user-operated actuator alterable from a first state to a second state due to the application of the force to the user-operated actuator;

a first resilient element that biases the user-operated actuator into the first state;

a second resilient element that biases the locking assembly into the locked state; and wherein the force applied to the user-operated actuator must overcome a biasing force of both of the first and second resilient elements to alter the locking assembly from the locked state to the unlocked state using the user-operated actuator.

19. The ladder according to claim 18 further comprising:

the second resilient element operably coupled to the locking member;

wherein the locking assembly can be altered from the locked state to the unlocked state by an opening force applied directly to the locking member of the locking assembly; and wherein the opening force must only overcome the biasing force of the second resilient element to alter the locking assembly from the locked state to the unlocked state.

20. The ladder according to claim 19 wherein the opening force is applied to the locking member by a locking component of the locking bar, the locking bar having a first end pivotably coupled to the second side rail and a second end slidably coupled to the at least one locking rung, and wherein when the first ladder section is being altered from the rail-to-rail collapsed state to the load bearing ladder state, the second end of the locking bar slides within the track of the at least one locking rung so the locking component contacts the locking member and applies the opening force, thereby allowing the locking component to enter an engagement feature of the locking member, and wherein upon the locking component entering the engagement feature of the locking member, the second resilient element biases the locking assembly into the locked state in which the engagement feature closes and engages the locking component.

* * * * *